United States Patent
Fujimoto et al.

(10) Patent No.: US 12,489,121 B2
(45) Date of Patent: Dec. 2, 2025

(54) METAL-LOADED CATALYST, BATTERY ELECTRODE AND BATTERY

(71) Applicant: NISSHINBO HOLDINGS INC., Tokyo (JP)

(72) Inventors: Ayaka Fujimoto, Chiba (JP); Yoshikazu Kobayashi, Chiba (JP); Tetsutaro Sato, Kisarazu (JP); Takeaki Kishimoto, Funabashi (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 477 days.

(21) Appl. No.: 18/022,815

(22) PCT Filed: Aug. 10, 2021

(86) PCT No.: PCT/JP2021/029490
§ 371 (c)(1),
(2) Date: Feb. 23, 2023

(87) PCT Pub. No.: WO2022/054485
PCT Pub. Date: Mar. 17, 2022

(65) Prior Publication Data
US 2023/0317969 A1    Oct. 5, 2023

(30) Foreign Application Priority Data
Sep. 10, 2020   (JP) .................. 2020-152111

(51) Int. Cl.
*H01M 4/92*     (2006.01)
*H01M 8/10*     (2016.01)

(52) U.S. Cl.
CPC .... *H01M 4/926* (2013.01); *H01M 2008/1095* (2013.01)

(58) Field of Classification Search
None
See application file for complete search history.

(56) References Cited

U.S. PATENT DOCUMENTS

| | | |
|---|---|---|
| 2009/0233135 A1 | 9/2009 | Horiuchi et al. |
| 2011/0262802 A1 | 10/2011 | Uono et al. |

(Continued)

FOREIGN PATENT DOCUMENTS

| | | |
|---|---|---|
| CN | 102203989 A | 9/2011 |
| CN | 102648050 A | 8/2012 |

(Continued)

OTHER PUBLICATIONS

Oct. 12, 2021 International Search Report issued in International Patent Application No. PCT/JP2021/029490.

(Continued)

*Primary Examiner* — Colin W. Slifka
(74) *Attorney, Agent, or Firm* — Oliff PLC

(57) ABSTRACT

A metal-supported catalyst, a battery electrode, and a battery. The metal-supported catalyst includes: a carbon carrier; and catalyst metal particles supported on the carbon carrier, wherein a ratio of number-average particle diameter of catalyst metal particles to average pore diameter of metal-supported catalyst is 0.70 or more and 1.30 or less, wherein, at relative pressure of a nitrogen adsorption isotherm of metal-supported catalyst within a range of 0.4 or more and 0.6 or less, maximum value of a ratio of a nitrogen adsorption amount of a desorption-side isotherm to a nitrogen adsorption amount of an adsorption-side isotherm is 1.05 or less, and wherein proportion of number of the catalyst metal particles each supported at a position having a depth of 20 nm or more from an outer surface of the carbon carrier to a total number of the catalyst metal particles supported on the carbon carrier is 11% or more.

15 Claims, 7 Drawing Sheets

(56) References Cited

U.S. PATENT DOCUMENTS

| | | |
|---|---|---|
| 2012/0231338 A1 | 9/2012 | Matsuzaka et al. |
| 2014/0287344 A1 | 9/2014 | Suzue et al. |
| 2015/0290624 A1 | 10/2015 | Sharma et al. |
| 2016/0072133 A1 | 3/2016 | Akizuki et al. |
| 2016/0197358 A1 | 7/2016 | Arihara et al. |
| 2017/0187047 A1 | 6/2017 | Mizutani et al. |
| 2017/0244125 A1 | 8/2017 | Takahashi et al. |
| 2017/0252725 A1 | 9/2017 | Bakker et al. |
| 2018/0277856 A1 | 9/2018 | Arihara et al. |
| 2020/0044261 A1 | 2/2020 | Ijima et al. |
| 2020/0127301 A1 | 4/2020 | Sato et al. |
| 2020/0176786 A1 | 6/2020 | Ishida |
| 2020/0254432 A1 | 8/2020 | Shirman et al. |
| 2020/0287221 A1 | 9/2020 | Iijima et al. |

FOREIGN PATENT DOCUMENTS

| | | |
|---|---|---|
| CN | 105594035 A | 5/2016 |
| CN | 107078307 A | 8/2017 |
| EP | 4008429 A1 | 6/2022 |
| JP | 2008-041253 A | 2/2008 |
| JP | 2008-207072 A | 9/2008 |
| JP | 2015-164889 A | 9/2015 |
| JP | 2017-064675 A | 4/2017 |
| JP | 2017-091812 A | 5/2017 |
| JP | 2017-117665 A | 6/2017 |
| JP | 2019-218231 A | 12/2019 |
| WO | 2007/055411 A1 | 5/2007 |
| WO | 2014/175105 A1 | 10/2014 |
| WO | 2018/116586 A1 | 6/2018 |
| WO | 2018/182048 A1 | 10/2018 |
| WO | 2019/004472 A1 | 1/2019 |
| WO | 2019/065443 A1 | 4/2019 |
| WO | 2019/068110 A1 | 4/2019 |

OTHER PUBLICATIONS

Oct. 19, 2021 International Search Report issued in International Patent Application No. PCT/JP2021/029491.

Scholz, K. et al., "Partially embedded highly dispersed Pt nanoparticles in mesoporous carbon with enhanced eaching stability", Carbon, vol. 48, Jan. 2010, pp. 1788-1798.

Vellaichamy, B. et al., "Silver nanoparticle-embedded RGO-nanosponge for superior catalytic activity towards 4-nitrophenol reduction", RSC Advances, 2016, vol. 6, pp. 88837-88845.

U.S. Appl. No. 18/022,820, filed Feb. 23, 2023 in the name of Takuya Ishizuka.

Apr. 23, 2025 Extended European Search Report issued in European Patent Application No. 21866445.6.

Wikander et al., Incorporation of platinum nanoparticles in ordered mesoporous carbon, Journal of Colloid and Interface Science, 2006, p. 204-208, vol. 305, No. 1.

Park et al., Effects of carbon supports on Pt distribution, ionomer coverage and cathode performance for polymer electrolyte fuel cells, Journal of Power Sources, 2016, p. 179-191, vol. 315.

Vengatesan et al., High dispersion platinum catalyst using mesoporous carbon support for fuel cells, Electrochimica Acta, 2008, p. 856-861, vol. 54, No. 2.

Apr. 23, 2025 Extended European Search Report issued in European Patent Application No. 21866446.4.

Nov. 5, 2024 Office Action issued in Chinese Patent Application No. 202180062281.1.

Sep. 4, 2025 Office Action issued in U.S. Appl. No. 18/022,820.

FIG.7

| | | EXAMPLE1 | EXAMPLE2 | EXAMPLE3 | EXAMPLE4 | EXAMPLE5 | EXAMPLE6 | EXAMPLE C1 | EXAMPLE C2 | EXAMPLE C3 | EXAMPLE C4 | EXAMPLE C5 | EXAMPLE C6 | EXAMPLE C7 |
|---|---|---|---|---|---|---|---|---|---|---|---|---|---|---|
| PRODUCTION METHOD | CARBON CARRIER | A | A | A | B | A | B | G | - | - | - | A | A | D |
| | METHOD OF SUPPORTING CATALYST METAL PARTICLES | A | B | C | D | E | A | B | - | - | - | F | G | A |
| | BURIAL OF CATALYST METAL PARTICLES IN PORE INNER SURFACE | ○ | ○ | ○ | ○ | ○ | ○ | × | × | × | × | × | × | × |
| CHARACTERISTICS OF METAL-SUPPORTED CATALYST | MEDIAN DIAMETER OF CARBON CARRIER(μm) | 0.31 | 0.31 | 0.31 | 0.58 | 0.31 | 0.58 | 0.20 | | | | 0.31 | 0.31 | 0.28 |
| | CATALYST METAL SUPPORTED PROPORTION AT OUTER SURFACE(%) | 16% | 18% | 27% | 32% | 32% | 16% | 67% | 37% | 19% | | 35% | 42% | 35% |
| | CATALYST METAL SUPPORTED PROPORTION AT OUTER SURFACE+DEPTH OF 5nm OR LESS(%) | 31% | 37% | 49% | 51% | 43% | 48% | 83% | 62% | 50% | | 55% | 61% | 55% |
| | CATALYST METAL SUPPORTED PROPORTION AT A DEPTH OF 20nm OR MORE(%) | 25% | 20% | 15% | 15% | 20% | 15% | 0% | 4% | 4% | | 8% | 3% | 10% |
| | NUMBER-AVERAGE PARTICLE DIAMETER OF CATALYST METAL PARTICLES(nm) | 2.99 | 2.95 | 2.99 | 3.57 | 3.12 | 3.31 | 3.45 | 2.01 | 1.87 | 1.88 | 3.54 | 4.22 | 2.99 |
| | VOLUME-AVERAGE PARTICLE DIAMETER OF CATALYST METAL PARTICLES(nm) | 3.81 | 3.75 | 4.67 | 4.74 | 5.55 | 4.25 | 5.45 | 2.13 | 2.21 | 2.19 | 5.23 | 7.89 | 5.29 |
| | AVERAGE PORE DIAMETER(nm) | 3.42 | 3.11 | 3.14 | 3.16 | 3.41 | 3.18 | 5.44 | 5.05 | 5.16 | 5.94 | 3.21 | 3.18 | 3.07 |
| | CATALYST METAL PARTICLE DIAMETER/PORE DIAMETER RATIO | 0.87 | 0.95 | 0.95 | 1.13 | 0.91 | 1.04 | 0.63 | 0.40 | 0.36 | 0.32 | 1.10 | 1.33 | 0.97 |
| | MAXIMUM VALUE OF N2 DESORPTION/ADSORPTION AMOUNT RATIO | 1.01 | 1.01 | 1.01 | 1.01 | 1.01 | 1.01 | 1.23 | 1.08 | 1.08 | 1.02 | 1.05 | 1.01 | 1.06 |
| | TORTUOSITY | 1.70 | 1.70 | 1.78 | 1.81 | 1.72 | 1.82 | | 1.89 | 1.96 | | 1.70 | 1.74 | 1.83 |
| | N2-BET SPECIFIC SURFACE AREA(m²/g-CARBON CARRIER) | 1188 | 1383 | 1462 | 1803 | 1250 | 1780 | 994 | 523 | 545 | 210 | 1011 | 997 | 802 |
| | WATER VAPOR-BET/N2-BET SPECIFIC SURFACE AREA RATIO | 0.045 | 0.035 | 0.029 | 0.029 | 0.046 | 0.032 | 0.016 | 0.149 | 0.125 | 0.22 | 0.127 | 0.086 | 0.063 |
| | 5 nm OR MORE PORE VOLUME(cm³/g-CARBON CARRIER) | 0.29 | 0.39 | 0.38 | 0.40 | 0.30 | 0.39 | 0.77 | 0.38 | 0.42 | 0.22 | 0.28 | 0.26 | 0.26 |
| | LESS THAN 5 nm PORE VOLUME(cm³/g-CARBON CARRIER) | 0.75 | 0.88 | 0.89 | 1.16 | 0.78 | 1.14 | 0.64 | 0.32 | 0.35 | 0.10 | 0.68 | 0.57 | 0.47 |
| | LESS THAN 5 nm PORE/5 nm OR MORE PORE VOLUME RATIO | 2.60 | 2.25 | 2.35 | 2.90 | 2.60 | 2.92 | 0.83 | 0.85 | 0.83 | 0.45 | 2.43 | 2.19 | 1.78 |
| | TOTAL PORE VOLUME(cm³/g-CARBON CARRIER) | 1.04 | 1.27 | 1.27 | 1.56 | 1.08 | 1.53 | 1.41 | 0.70 | 0.77 | 0.32 | 0.96 | 0.83 | 0.73 |
| | NITROGEN CONTENT OF CARBON CARRIER(wt%) | 0.34 | 0.34 | 0.34 | 2.51 | 0.34 | 2.51 | 0.00 | 0.00 | 0.00 | 0.00 | 0.34 | 0.34 | 0.32 |
| | NITROGEN CONTENT OF METAL-SUPPORTED CATALYST(wt%) | 0.30 | 0.28 | 0.28 | 2.40 | 0.30 | 2.30 | 0.00 | 0.00 | 0.00 | 0.00 | 0.28 | 0.27 | 0.27 |
| | RAMAN D HALF WIDTH AT HALF MAXIMUM(cm⁻¹) | 49.2 | 46.2 | 38.6 | 72.3 | 39.1 | 80.6 | 54 | 71.4 | 73.3 | 88.7 | 45.3 | 45.5 | 67.9 |
| PERFORMANCE OF BATTERY | MAXIMUM OUTPUT DENSITY(mW/cm²) | 1451 | 1315 | 1361 | 1096 | 1255 | 1274 | 1086 | 1220 | 813 | 987 | 1075 | 894 | 1063 |
| | VOLTAGE DECREASE AMOUNT(mV) at 1.0A/cm² | 25 | 4 | 7 | 36 | 31 | 32 | 31 | 40 | 135 | 180 | 46 | 33 | 45 |
| | VOLTAGE DECREASE AMOUNT(mV) at 3.0A/cm² | 19 | 8 | 12 | 53 | 26 | 36 | 75 | 85 | UNMEASURABLE | UNMEASURABLE | 96 | 25 | 103 |
| CATALYTIC ACTIVITY OF CARBON CARRIER | E-O2 (V vs.NHE) | 0.76 | 0.76 | 0.76 | 0.83 | 0.76 | 0.83 | 0.26 | | | | 0.76 | 0.76 | 0.75 |
| | I-O2(mA/cm²) | -0.1 | -0.1 | -0.1 | -1.8 | -0.1 | -1.8 | 0 | | | | -0.1 | -0.1 | -0.1 |

METAL-LOADED CATALYST, BATTERY ELECTRODE AND BATTERY

TECHNICAL FIELD

The present invention relates to a metal-supported catalyst, a battery electrode, and a battery.

BACKGROUND ART

In Patent Literature 1, there is a description of a catalyst for a fuel cell, including a catalyst supported on a carrier, wherein the catalyst for a fuel cell has a value of 0.5 or more and 1.8 or less for average pore diameter of catalyst carrier/catalyst metal particle diameter (PGM).

In Patent Literature 2, there is a description of a catalyst formed of a catalyst carrier and a catalyst metal supported on the catalyst carrier, wherein the catalyst has a specific surface area per weight of the carrier of 715 m$^2$/g-carrier or more, and wherein an amount of an acidic group per weight of the carrier in the catalyst is 0.75 mmol/g-carrier or less, In Patent Literature 3, there is a description of a polymer electrolyte fuel cell electrode catalyst having the following configurations (1) and (2). (1) The polymer electrolyte fuel cell electrode catalyst includes a carrier formed of a conductive material, and catalyst particles supported on a surface of the carrier. (2) The carrier has interconnected mesopores, and satisfies a relationship of the following expression: $1.0 \leq \Delta Vdes/\Delta Vads \leq 1.14$ (where $\Delta Vdes=Vdes(0.49)-Vdes(0.01)$, $\Delta Vads=Vads(0.49)-Vads(0.01)$, $Vdes(0.49)$ represents an adsorption amount in a desorption process of a nitrogen adsorption isotherm in a mesopore region at relative pressure $P/P0=0.49$, $Vdes(0.01)$ represents an adsorption amount in a desorption process of a nitrogen adsorption isotherm in a micropore region at relative pressure $P/P0=0.01$, $Vads(0.49)$ represents an adsorption amount in an adsorption process of the nitrogen adsorption isotherm in the mesopore region at relative pressure $P/P0=0.49$, and $Vads(0.01)$ represents an adsorption amount in an adsorption process of the nitrogen adsorption isotherm in the micropore region at relative pressure $P/P0=0.01$).

In Patent Literature 4, there is a description of a catalyst for a polymer electrolyte fuel cell, including catalyst particles, each of which is formed of platinum, cobalt, and manganese, supported on a carbon powder carrier, wherein the catalyst particles each have a constituent ratio of platinum, cobalt, and manganese as Pt:Co:Mn=1:0.25 to 0.28: 0.07 to 0.10 in a molar ratio, wherein the catalyst particles have an average particle diameter of from 3.4 nm to 5.0 nm, and further, in a particle size distribution of the catalyst particles, a proportion of catalyst particles each having a particle diameter of 3.0 nm or less in all the catalyst particles is 37% or less on a particle number basis, and wherein at least a surface of each of the catalyst particles supports a fluorine compound having a C—F bond.

CITATION LIST

Patent Literature

[PTL 1] WO 2007/055411 A1
[PTL 2] WO2014/175105 A1
[PTL 3] JP 2017-091812 A
[PTL 4] WO 2019/065443 A1

SUMMARY OF INVENTION

Technical Problem

However, it has hitherto been difficult to obtain a metal-supported catalyst having both excellent catalytic activity and durability.

The present invention has been made in view of the above-mentioned problem, and one of the objects of the present invention is to provide a metal-supported catalyst, a battery electrode, and a battery each having both excellent catalytic activity and durability.

Solution to Problem

In order to achieve the above-mentioned object, according to one embodiment of the present invention, there is provided a metal-supported catalyst, including: a carbon carrier; and catalyst metal particles supported on the carbon carrier, wherein a ratio of a number-average particle diameter of the catalyst metal particles to an average pore diameter of the metal-supported catalyst is 0.70 or more and 1.30 or less, wherein, at a relative pressure of a nitrogen adsorption isotherm of the metal-supported catalyst within a range of 0.4 or more and 0.6 or less, a maximum value of a ratio of a nitrogen adsorption amount of a desorption-side isotherm to a nitrogen adsorption amount of an adsorption-side isotherm is 1.05 or less, and wherein a proportion of a number of the catalyst metal particles supported at a position having a depth of 20 nm or more from an outer surface of the carbon carrier to a total number of the catalyst metal particles supported on the carbon carrier is 118 or more. According to the one embodiment of the present invention, the metal-supported catalyst having both excellent catalytic activity and durability is provided.

The metal-supported catalyst may include the catalyst metal particles that are partially buried in a pore inner surface of the carbon carrier. In the metal-supported catalyst, a proportion of a number of the catalyst metal particles supported on the outer surface of the carbon carrier to the total number of the catalyst metal particles supported on the carbon carrier may be 33% or less.

In the metal-supported catalyst, the number-average particle diameter of the catalyst metal particles may be 1.50 nm or more and 5.00 nm or less. In the metal-supported catalyst, a volume-average particle diameter of the catalyst metal particles may be 2.00 nm or more and 6.50 nm or less.

In the metal-supported catalyst, the metal-supported catalyst may have a BET specific surface area by a nitrogen adsorption method of 200 (m$^2$/g-carbon carrier) or more. The metal-supported catalyst may have a ratio of a BET specific surface area (m$^2$/g-carbon carrier) by a water vapor adsorption method, to a BET specific surface area (m$^2$/g-carbon carrier) by a nitrogen adsorption method, of 0.080 or less.

The metal-supported catalyst may have a volume of pores each having a pore diameter of less than 5 nm of 0.50 (cm$^3$/g-carbon carrier) or more. The metal-supported catalyst may have a ratio of a volume of pores each having a pore diameter of less than 5 nm, to a volume of pores each having a pore diameter of 5 nm or more, of 1.80 or more. The metal-supported catalyst may have a tortuosity of 1.90 or less.

The metal-supported catalyst may have a carbon structure that exhibits a half width at half maximum of 85.0 cm$^{-1}$ or less of a D band having a peak top in a vicinity of 1, 340 cm$^{-1}$ in a Raman spectrum obtained by Raman spectroscopy. In the metal-supported catalyst, the carbon carrier may have a median diameter of 1.00 μm or less. In the metal-supported catalyst, the catalyst metal particles may be platinum particles.

In order to achieve the above-mentioned object, according to one embodiment of the present invention, there is provided a battery electrode, including the metal-supported catalyst. According to the one embodiment of the present invention, the battery electrode having both excellent catalytic activity and durability is provided.

In order to achieve the above-mentioned object, according to one embodiment of the present invention, there is provided a battery, including the battery electrode. According to the one embodiment of the present invention, the battery having both excellent catalytic activity and durability is provided.

Advantageous Effects of Invention

According to the present invention, a metal-supported catalyst, a battery electrode, and a battery each having both excellent catalytic activity and durability are provided.

BRIEF DESCRIPTION OF DRAWINGS

FIG. 7 is an explanatory diagram showing evaluation results of the characteristics of metal-supported catalysts, the performances of batteries, and the catalytic activities of carbon carriers.

DESCRIPTION OF EMBODIMENTS

Figure 1:
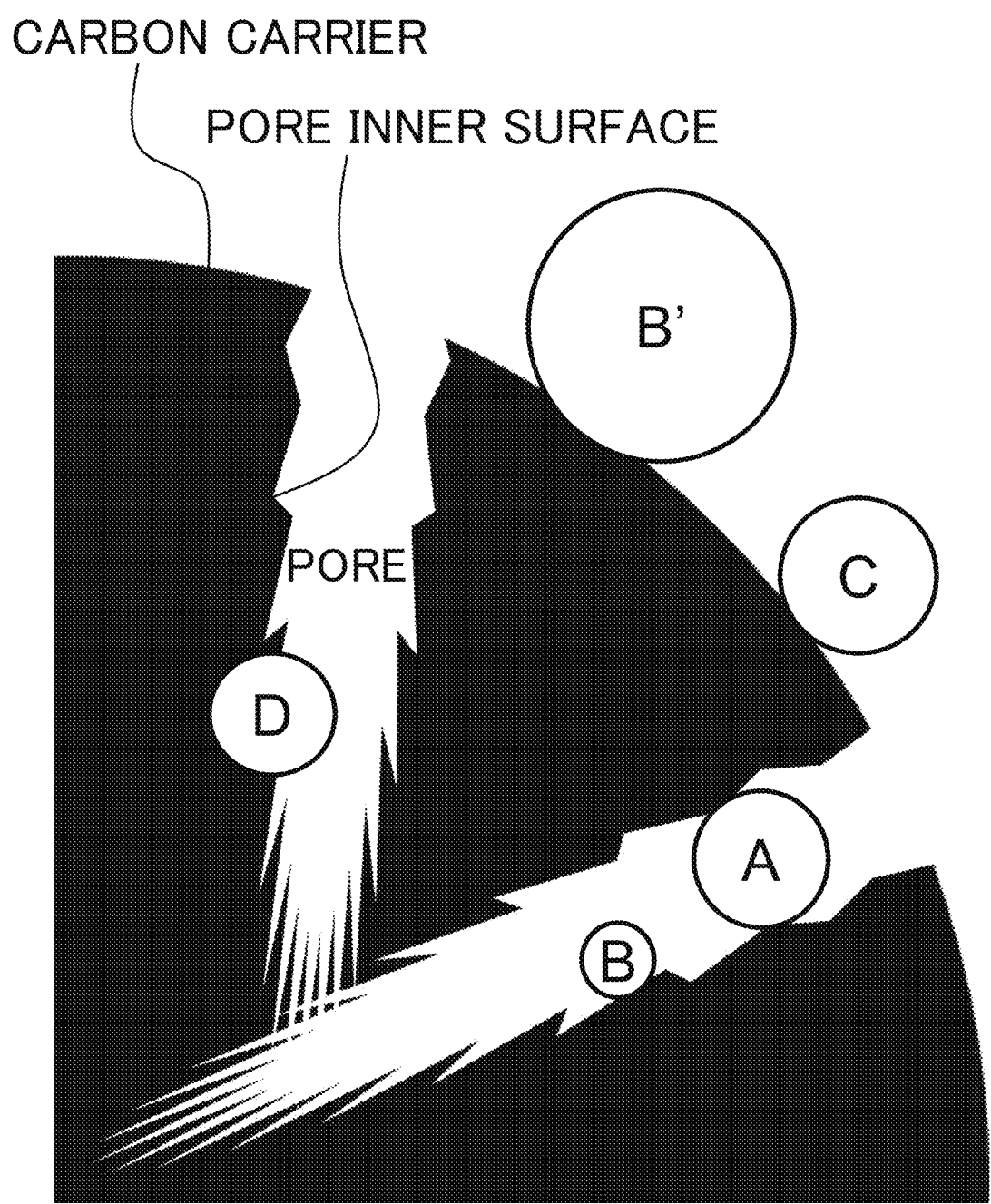
FIG. 1 is an explanatory view for schematically illustrating the relationship of the sizes of pores of a carbon carrier in a metal-supported catalyst with the sizes and arrangement of catalyst metal particles supported on the carbon carrier.

One of the embodiments of the present invention will be described below. The present invention is not limited to examples described in the embodiment.

A metal-supported catalyst according to an embodiment of the present invention (hereinafter referred to as "catalyst of the present invention") is a metal-supported catalyst including: a carbon carrier; and catalyst metal particles supported on the carbon carrier, wherein a ratio of a number-average particle diameter of the catalyst metal particles, to an average pore diameter of the metal-supported catalyst, is 0.70 or more and 1.30 or less, wherein, at a relative pressure of a nitrogen adsorption isotherm of the metal-supported catalyst within a range of 0.4 or more and 0.6 or less, a maximum value of a ratio of a nitrogen adsorption amount of a desorption-side isotherm to a nitrogen adsorption amount of an adsorption-side isotherm is 1.05 or less, and wherein a proportion of the number of the catalyst metal particles supported at a position having a depth of 20 nm or more from an outer surface of the carbon carrier to the total number of the catalyst metal particles supported on the carbon carrier is 118 or more.

The catalyst of the present invention includes a carbon carrier and catalyst metal particles supported on the carbon carrier. It is preferred that the catalyst of the present invention be mainly formed of the carbon carrier and the catalyst metal particles. The proportion of the sum of the weight of the carbon carrier included in the catalyst of the present invention and the weight of the catalyst metal particles included in the catalyst of the present invention, to the weight of the catalyst of the present invention, may be, for example, 90 wt % or more (90 wt % or more and 100 wt % or less), and is preferably 95 wt % or more, particularly preferably 98 wt % or more. The proportion of the sum of the weight of the carbon carrier included in the catalyst of the present invention and the weight of the catalyst metal particles included therein, to the weight of the catalyst of the present invention, is obtained by thermogravimetry (TG).

The carbon carrier included in the catalyst of the present invention is a carbon material mainly formed of carbon. The carbon content of the carbon carrier may be, for example, 70 wt % or more (70 wt % or more and 100 wt % or less), and is preferably 75 wt % or more, more preferably 80 wt % or more, and particularly preferably 85 wt % or more. The carbon content of the carbon carrier is obtained by elemental analysis (combustion method) of the carbon carrier.

The carbon carrier is preferably a porous carbon material. In this case, the carbon carrier preferably contains pores having high interconnectivity. That is, the carbon carrier is preferably a carbon material having many interconnected pores.

The carbon carrier may be a carbonized material. The carbonized material is obtained by carbonizing a raw material containing an organic substance. The content of the organic substance in the raw material for carbonization may be, for example, 5 wt % or more and 90 wt % or less, and is preferably 10 wt % or more and 80 wt % or less.

The organic substance contained in the raw material is not particularly limited as long as the organic substance can be carbonized. An organic compound contained in the organic substance may be a polymer (e.g., a thermosetting resin and/or a thermoplastic resin), and/or may be an organic compound having a smaller molecular weight.

Specifically, the organic substance may be, for example, one or more kinds selected from the group consisting of: polyacrylonitrile; a polyacrylonitrile-polyacrylic acid copolymer; a polyacrylonitrile-polymethyl acrylate copolymer; a polyacrylonitrile-polymethacrylic acid copolymer; a polyacrylonitrile-polymethacrylic acid-polymethallylsulfonic acid copolymer; a polyacrylonitrile-polymethyl methacrylate copolymer; a phenol resin; polyfurfuryl alcohol; furan; a furan resin; a phenol formaldehyde resin; melamine; a melamine resin; an epoxy resin; a nitrogen-containing chelate resin (e.g., one or more kinds selected from the group consisting of: a polyamine-type chelate resin; an iminodiacetic acid-type chelate resin; an aminophosphoric acid-type chelate resin; and an aminomethylphosphonic acid-type chelate resin); a polyamide-imide resin; pyrrole; polypyrrole; polyvinyl pyrrole; 3-methyl polypyrrole; acrylonitrile; polyvinylidene chloride; thiophene; oxazole; thiazole; pyrazole; vinylpyridine; polyvinylpyridine; pyridazine; pyrimidine; piperazine; pyran; morpholine; imidazole; 1-methylimidazole; 2-methylimidazole; quinoxaline; aniline; polyaniline; succinic acid dihydrazide; adipic acid dihydrazide; polysulfone; polyaminobismaleimide; polyimide; polyvinyl alcohol; polyvinyl butyral; benzimidazole; polybenzimidazole; polyamide; polyester; polylactic acid; polyether; polyether ether ketone; cellulose; carboxymethyl cellulose; lignin; chitin; chitosan; pitch; silk; wool; polyamino acid; a nucleic acid; DNA; RNA; hydrazine; hydrazide; urea; salen; polycarbazole; polybismaleimide; triazine; polyacrylic acid; a polyacrylic acid ester; a polymethacrylic acid ester; polymethacrylic acid; polyurethane; polyamidoamine; and polycarbodiimide.

The carbon carrier preferably contains nitrogen. That is, in this case, the carbon carrier contains a nitrogen atom in its carbon structure. The carbon carrier containing nitrogen is preferably a carbonized material containing nitrogen. The carbonized material containing nitrogen is obtained by carbonizing a raw material containing a nitrogen-containing organic substance. The nitrogen-containing organic substance preferably contains a nitrogen-containing organic compound. The nitrogen-containing organic compound is not particularly limited as long as the organic compound contains a nitrogen atom in its molecule. In addition, the nitrogen contained in the carbon carrier may be nitrogen introduced by nitrogen doping treatment.

The nitrogen content of the carbon carrier may be, for example, 0.10 wt % or more, and is preferably 0.15 wt % or more, more preferably 0.20 wt % or more, still more preferably 0.25 wt % or more, and particularly preferably 0.30 wt % or more. The upper limit value of the nitrogen content of the carbon carrier is not particularly limited, but the nitrogen content may be, for example, 10.00 wt % or less. The nitrogen content of the carbon carrier is obtained by elemental analysis (combustion method) of the carbon carrier.

The carbonization in the production of the carbonized material is performed by heating the raw material and keeping the raw material at a temperature at which the organic substance contained therein is carbonized (hereinafter referred to as "carbonizing temperature"). The carbonizing temperature is not particularly limited as long as the raw material is carbonized at the temperature, and may be, for example, 300° C. or more, and is preferably 700° C. or more, more preferably 900° C. or more, still more preferably 1,000° C. or more, and particularly preferably 1,100° C. or more. The upper limit value of the carbonizing temperature is not particularly limited, but the carbonizing temperature may be, for example, 3,000° C. or less.

A temperature increase rate up to the carbonizing temperature is not particularly limited, and may be, for example, 0.5° C./min or more and 300° C./min or less. In the carbonization, a period of time for which the raw material is kept at the carbonizing temperature may be, for example, 1 second or more and 24 hours or less, and is preferably 5 minutes or more and 24 hours or less. The carbonization is preferably performed in an inert atmosphere such as a nitrogen atmosphere.

The carbonization may be performed under normal pressure (atmospheric pressure), but is preferably performed under pressure (under a pressure higher than atmospheric pressure). When the carbonization is performed under pressure, the pressure of the atmosphere for carbonization may be, for example, 0.05 MPa or more in terms of a gauge pressure, and is preferably 0.15 MPa or more, more preferably 0.20 MPa or more, still more preferably 0.40 MPa or more, and particularly preferably 0.50 MPa or more in terms of a gauge pressure. The upper limit value of the pressure of the atmosphere for carbonization is not particularly limited, but the pressure may be, for example, 10.00 MPa or less.

The carbon carrier may be a carbonized material obtained by carbonizing a raw material containing an organic substance and a metal. In this case, the carbon carrier may be a carbonized material subjected to metal removal treatment after the carbonization. The metal removal treatment is treatment for reducing the amount of a raw material-derived metal contained in the carbonized material. Specifically, the metal removal treatment is preferably, for example, washing treatment with an acid and/or electrolytic treatment.

When the carbon carrier is a carbonized material obtained by carbonizing a raw material containing an organic substance and a metal, the carbon carrier contains a metal derived from the raw material for carbonization (hereinafter referred to as "raw material metal"). In this case, the carbon carrier contains the raw material metal inside a skeleton thereof. That is, the carbon carrier contains the raw material metal inside a skeleton forming a porous structure thereof. Even when the carbon carrier is a carbonized material produced through metal removal treatment as described above, the raw material metal remains inside the skeleton of the carbon carrier. Among the raw material metals contained in the carbon carrier, the weight of a raw material metal contained inside the skeleton of the carbon carrier may be larger than the weight of a raw material metal contained in the surface of the skeleton of the carbon carrier.

The raw material metal inside the skeleton of the carbon carrier is detected by subjecting the skeleton to surface etching treatment and analyzing a cross-section exposed by the etching treatment. That is, when one particle of the carbon carrier is subjected to etching treatment, the raw material metal is detected in a cross-section of the particle exposed by the etching treatment. The raw material metal contained in the carbon carrier may be detected by, for example, inductively coupled plasma mass spectrometry (ICP-MS) of the carbon carrier.

The raw material metal content of the carbon carrier (proportion of the weight of the raw material metal contained in the carbon carrier to the weight of the carbon carrier) may be, for example, 0.01 wt % or more, 0.03 wt % or more, or 0.05 wt % or more. In addition, the raw material metal content of the carbon carrier may be, for example, 5.00 wt % or less, 4.00 wt % or less, or 3.00 wt % or less. The raw material metal content of the carbon carrier may be specified by arbitrarily combining any one of the abovementioned lower limit values and any one of the abovementioned upper limit values. The raw material metal content of the carbon carrier is obtained by ICP-MS of the carbon carrier.

The carbon carrier is preferably a carbon material exhibiting catalytic activity. That is, the carbon carrier is preferably a carbon catalyst that itself exhibits catalytic activity alone. The carbon catalyst is preferably a carbonized material containing a raw material metal, which is obtained by carbonizing a raw material containing an organic substance and a metal as described above.

The catalytic activity to be exhibited by the carbon catalyst is, for example, preferably reduction activity and/or oxidation activity, more preferably oxygen reduction activity and/or hydrogen oxidation activity, and particularly preferably at least oxygen reduction activity.

Specifically, the carbon carrier may exhibit oxygen reduction activity that achieves a reduction current density $I_{0.7}$ of 0.01 (mA/cm$^2$) or more when a voltage of 0.7 V (vs. NHE) is applied in an oxygen reduction voltammogram obtained through use of a rotating disk electrode apparatus including a working electrode carrying the carbon carrier at a density of 0.1 mg/cm$^2$ (content per unit area of the battery electrode). The carbon carrier preferably exhibits oxygen reduction activity that achieves a reduction current density $I_{0.7}$ of 0.05 (mA/cm$^2$) or more, and particularly preferably exhibits oxygen reduction activity that achieves a reduction current density $I_{0.7}$ of 0.08 (mA/cm$^2$) or more. The upper limit value of the reduction current density Ion is not particularly limited, but may be, for example, 7.00 (mA/cm$^2$) or less.

In addition, the carbon carrier may exhibit oxygen reduction activity that achieves an oxygen reduction-starting potential $E_{O2}$ of 0.35 (V vs. NHE) or more when a reduction current of $-10$ μA/cm$^2$ flows in an oxygen reduction voltammogram obtained through use of a rotating disk electrode apparatus including a working electrode carrying the carbon carrier at a density of 0.1 mg/cm$^2$ (content per unit area of the battery electrode). The carbon carrier preferably exhibits oxygen reduction activity that achieves an oxygen reduction-starting potential $E_{O2}$ of 0.50 (V vs. NHE) or more, and particularly preferably exhibits oxygen reduction activity that achieves an oxygen reduction-starting potential $E_{O2}$ of 0.65 (V vs. NHE) or more. The upper limit value of the oxygen reduction-starting potential $E_{O2}$ is not particularly limited, but may be, for example, 1.23 (V vs. NHE) or less.

It is conceived that the catalytic activity exhibited by the carbon catalyst obtained by carbonizing a raw material containing an organic substance and a metal is mainly caused by active sites contained in a unique carbon structure formed by the carbonization, rather than the raw material metal contained in the carbon catalyst. The foregoing is supported by the following facts: even when the carbonized material obtained by the carbonization is subjected to metal removal treatment for reducing the content of the raw material metal thereof, the catalytic activity of the carbonized material after the metal removal treatment is not significantly reduced compared to that before the metal removal treatment; and a carbon material obtained by supporting a metal on the surface of a carbonized material, which is obtained by carbonizing a raw material that contains an organic substance but does not contain a metal, does not have excellent catalytic activity, unlike the carbonized material obtained by carbonizing a raw material containing the organic substance and the metal.

The raw material metal is preferably a transition metal. That is, the raw material metal may be a transition metal belonging to Groups III to XII in the periodic table. The raw material metal may be a transition metal other than platinum. The raw material metal may be a transition metal other than noble metals (e.g., ruthenium (Ru), palladium (Pd), rhodium (Rh), silver (Ag), osmium (Os), iridium (Ir), platinum (Pt), and gold (Au)). The raw material metal is preferably a transition metal belonging to the fourth period of Groups III to XII in the periodic table.

Specifically, the raw material metal may be, for example, one or more kinds selected from the group consisting of: scandium (Sc); titanium (Ti); vanadium (V); chromium (Cr); manganese (Mn); iron (Fe); cobalt (Co); nickel (Ni); copper (Cu); zinc (Zn); yttrium (Y); zirconium (Zr); niobium (Nb); molybdenum (Mo); ruthenium (Ru); rhodium (Rh); palladium (Pd); silver (Ag); lanthanoids (e.g., gadolinium (Gd)); and actinoids, and is preferably one or more kinds selected from the group consisting of: Fe; Co; Ni; Cu; and Zn, particularly preferably one or more kinds selected from the group consisting of: Fe; Co; Ni; and Zn.

The particle diameter of the carbon carrier is not particularly limited, but for example, the median diameter of the carbon carrier may be 1.00 μm or less, and is preferably 0.80 μm or less, more preferably 0.60 μm or less, still more preferably 0.50 μm or less, and particularly preferably 0.45 μm or less. The lower limit value of the median diameter of the carbon carrier is not particularly limited, but the median diameter may be, for example, 0.05 μm or more. The particle diameter of the carbon carrier is obtained by a laser diffraction method of the carbon carrier.

The catalyst metal particles included in the catalyst of the present invention are not particularly limited as long as the metal particles exhibit catalytic activity, for example, preferably metal particles which exhibit reduction activity and/or oxidation activity, more preferably metal particles which exhibit oxygen reduction activity and/or hydrogen oxidation activity, and particularly preferably metal particles which exhibit at least oxygen reduction activity.

Specifically, the catalyst metal particles are preferably metal particles containing a noble metal (hereinafter referred to as "noble metal particles"). The noble metal particles contain a pure noble metal (noble metal not forming an alloy) and/or a noble metal alloy. The catalyst metal particles (e.g., noble metal particles) may not contain the same kind of metal as the raw material metal.

The noble metal is, for example, preferably one or more kinds selected from the group consisting of: Ru; Pd; Rh; Ag; Os; Ir; Pt; and Au, more preferably one or more kinds selected from the group consisting of: Ru; Pd; Rh; Ir; and Pt, particularly preferably Pt. That is, the noble metal particles are particularly preferably Pt particles. The Pt particles contain pure Pt and/or a Pt alloy.

The noble metal alloy is an alloy of one or more kinds of noble metals and one or more kinds of non-noble metals. The non-noble metal is not particularly limited as long as the metal is a metal other than a noble metal and forms an alloy with the noble metal, but is preferably a transition metal. Specifically, the non-noble metal contained in the noble metal alloy is, for example, preferably one or more kinds selected from the group consisting of: Cu; Mn; Ce; Au; Pd; Ru; Nb; Ti; Fe; Co; and Ni, more preferably one or more kinds selected from the group consisting of: Fe; Co; and Ni, and particularly preferably one or more kinds selected from the group consisting of: Co; and Ni.

The content of the noble metal in the noble metal particles (proportion of the weight of the noble metal contained in the noble metal particles (when two or more kinds of noble metals are contained, the sum of the weights of the two or more kinds of noble metals) to the weight of the noble metal particle) is not particularly limited as long as the content falls within a range in which the effect of the present invention is obtained, but may be, for example, 50 wt % or more (50 wt % or more and 100 wt % or less), and is preferably 75 wt % or more, more preferably 85 wt % or more, particularly preferably 90 wt % or more. The noble metal content of the noble metal particles is obtained by ICP-MS.

When the catalyst metal particles are noble metal particles, the content of the noble metal in the catalyst of the present invention (proportion of the weight of the noble metal contained in the catalyst of the present invention to the weight of the catalyst of the present invention) may be, for example, 1.0 wt % or more, and is preferably 3.0 wt % or more, more preferably 5.0 wt % or more, still more preferably 10.0 wt % or more, and particularly preferably 15.0 wt % or more. The noble metal content of the catalyst of the present invention may be, for example, 60.0 wt % or less. The noble metal content of the metal-supported catalyst is obtained by ICP-MS.

When the catalyst metal particles are noble metal particles, and the catalyst of the present invention contains a non-noble metal (e.g., a non-noble metal contained in the noble metal alloy when the noble metal particles contain a noble metal alloy, and/or the raw material metal when the carbon carrier contains a raw material metal that is a non-noble metal), the molar ratio of the noble metal to the non-noble metal contained in the catalyst of the present invention (hereinafter referred to as "noble metal/non-noble metal molar ratio") may be, for example, 0.3 or more, and is preferably 0.5 or more, more preferably 1.0 or more, still more preferably 3.0 or more, and particularly preferably 4.0 or more. The noble metal/non-noble metal molar ratio of the catalyst of the present invention may be, for example, 20.0 or less, and is preferably 15.0 or less, particularly preferably 10.0 or less. The noble metal/non-noble metal molar ratio may be specified by arbitrarily combining any one of the above-mentioned lower limit values and any one of the above-mentioned upper limit values. The noble metal/non-noble metal molar ratio of the metal-supported catalyst is obtained by ICP-MS.

In the catalyst of the present invention, the number-average particle diameter of the catalyst metal particles may be, for example, 1.50 nm or more and 5.00 nm or less, and is preferably 1.90 nm or more and 4.00 nm or less, more preferably 2.10 nm or more and 3.80 nm or less, still more preferably 2.10 nm or more and 3.50 nm or less, and particularly preferably 2.10 nm or more and 3.40 nm or less. The number-average particle diameter of the catalyst metal particles is obtained by an X-ray diffraction method.

In the catalyst of the present invention, the volume-average particle diameter of the catalyst metal particles may be, for example, 2.00 nm or more and 6.50 nm or less, and is preferably 2.30 nm or more and 6.00 nm or less, more preferably 2.30 nm or more and 5.50 nm or less, still more preferably 2.30 nm or more and 5.30 nm or less, and particularly preferably 2.40 nm or more and 5.20 nm or less. The volume-average particle diameter of the catalyst metal particles is obtained by an X-ray diffraction method.

The ratio of the number-average particle diameter of the catalyst metal particles to the average pore diameter of the catalyst of the present invention (hereinafter referred to as "catalyst metal particle diameter/pore diameter ratio") is 0.70 or more and 1.30 or less. The catalyst metal particle diameter/pore diameter ratio of the catalyst of the present invention is, for example, preferably 0.72 or more and 1.20 or less, more preferably 0.75 or more and 1.10 or less, still more preferably 0.78 or more and 1.00 or less, particularly preferably 0.80 or more and 1.00 or less.

The catalyst metal particle diameter/pore diameter ratio of the catalyst of the present invention falling within the above-mentioned ranges indicates that many of the catalyst metal particles supported on the carbon carrier have particle diameters close to the diameters of the pores of the carbon carrier.

The average pore diameter of the catalyst of the present invention may be, for example, 2.00 nm or more and 5.00 nm or less, and is preferably 2.40 nm or more and 4.60 nm or less, more preferably 2.60 nm or more and 4.40 nm or less, still more preferably 2.80 nm or more and 4.20 nm or less, particularly preferably 3.00 nm or more and 4.00 nm or less.

The average pore diameter of the metal-supported catalyst is obtained by a nitrogen adsorption method of the metal-supported catalyst. Specifically, the average pore diameter of the metal-supported catalyst is obtained by the following equation through use of analysis software included with a commercially available specific c surface area/pore distribution measuring device: average pore diameter of a metal-supported catalyst (nm)=4×{total pore volume of the metal-supported catalyst $(cm^3$/g-metal-supported catalyst)×$10^{21}$}/ specific surface area of the metal-supported catalyst $(m^2$/g-metal-supported catalyst)×$10^{18}$.

The total pore volume of the catalyst of the present invention may be, for example, 0.50 $(cm^3$/g-carbon carrier) or more, and is preferably 0.70 $(cm^3$/g-carbon carrier) or more, more preferably 0.85 $(cm^3$/g-carbon carrier) or more, still more preferably 0.90 $(cm^3$/g-carbon carrier) or more, and particularly preferably 1.00 $(cm^3$/g-carbon carrier) or more. The upper limit value of the total pore volume of the catalyst of the present invention is not particularly limited, but the total pore volume may be, for example, 5.00 $(cm^3$/g-carbon carrier) or less. The total pore volume of the metal-supported catalyst is obtained by the nitrogen adsorption method (more specifically, BJH method) of the metal-supported catalyst. "/g-carbon carrier" in the unit of the numerical values indicates that the value is per 1 g of the carbon carrier included in the metal-supported catalyst.

The volume of pores each having a pore diameter of less than 5 nm (hereinafter referred to as "less than 5 nm pore volume") of the catalyst of the present invention may be, for example, 0.50 $(cm^3$/g-carbon carrier) or more, and is preferably 0.60 $(cm^3$/g-carbon carrier) or more, more preferably 0.65 $(cm^3$/g-carbon carrier) or more, and particularly preferably 0.70 $(cm^3$/g-carbon carrier) or more. The upper limit value of the less than 5 nm pore volume of the catalyst of the present invention is not particularly limited, but the less than 5 nm pore volume may be, for example, 5.00 $(cm^3$/g-carbon carrier) or less. The less than 5 nm pore volume of the metal-supported catalyst is obtained by the nitrogen adsorption method (more specifically, BJH method) of the metal-supported catalyst.

The fact that the less than 5 nm pore volume of the catalyst of the present invention is large contributes to the catalytic activity of the catalyst of the present invention. That is, for example, pores each having a relatively small pore diameter serve as places where catalyst metal particles exhibiting high catalytic activity and having a relatively small particle diameter are preferentially generated, and as a result, the pores contribute to the excellent catalytic activity of the catalyst of the present invention.

The volume of pores each having a pore diameter of 5 nm or more (hereinafter referred to as "5 nm or more pore volume") of the catalyst of the present invention may be, for example, 0.70 (cm$^3$/g-carbon carrier) or less, and is preferably 0.60 (cm$^3$/g-carbon carrier) or less, more preferably 0.50 (cm$^3$/g-carbon carrier) or less, and particularly preferably 0.45 (cm$^3$/g-carbon carrier) or less. The lower limit value of the 5 nm or more pore volume of the catalyst of the present invention is not particularly limited, but the 5 nm or more pore volume may be, for example, 0.10 (cm$^3$/g-carbon carrier) or more. The 5 nm or more pore volume of the metal-supported catalyst is obtained by the nitrogen adsorption method (more specifically, BJH method) of the metal-supported catalyst.

The ratio of the less than 5 nm pore volume of the catalyst of the present invention to the 5 nm or more pore volume of the catalyst of the present invention (hereinafter referred to as "less than 5 nm pore/5 nm or more pore volume ratio") may be, for example, 1.80 or more, and is preferably 1.90 or more, particularly preferably 2.00 or more. The upper limit value of the less than 5 nm pore/5 nm or more pore volume ratio of the catalyst of the present invention is not particularly limited, but the pore volume ratio may be, for example, 15.00 or less.

When the catalyst of the present invention contains many pores each having a pore diameter of less than 5 nm, for example, deterioration of the catalyst metal particles supported in the pores of the catalyst of the present invention (e.g., oxidation of a catalyst metal supported in a pore due to entry of water into the pore) is effectively suppressed.

The BET specific surface area by a nitrogen adsorption method (hereinafter referred to as "$N_2$-BET specific surface area") of the catalyst of the present invention may be, for example, 200 (m$^2$/g-carbon carrier) or more, and is preferably 600 (m$^2$/g-carbon carrier) or more, more preferably 900 (m$^2$/g-carbon carrier) or more, still more preferably 1,000 (m$^2$/g-carbon carrier) or more, and particularly preferably 1,100 (m$^2$/g-carbon carrier) or more. The upper limit value of the $N_2$-BET specific surface area of the catalyst of the present invention is not particularly limited, but the $N_2$-BET specific surface area may be, for example, 3,000 (m$^2$/g-carbon carrier) or less.

The ratio of the BET specific surface area (m$^2$/g-carbon carrier) by a water vapor adsorption method of the catalyst of the present invention to the $N_2$-BET specific surface area (m$^2$/g-carbon carrier) of the catalyst of the present invention (hereinafter referred to as "water vapor-BET/nitrogen-BET specific surface area ratio") may be, for example, 0.080 or less, and is preferably 0.070 or less, more preferably 0.060 or less, still more preferably 0.055 or less, and particularly preferably 0.050 or less. The lower limit value of the water vapor-BET/nitrogen-BET specific surface area ratio of the catalyst of the present invention is not particularly limited, but the specific surface area ratio may be, for example, 0.010 or more.

The fact that the hydrophobicity of the pores of the catalyst of the present invention is high indicates that the water vapor-BET/nitrogen-BET specific surface area ratio of the catalyst of the present invention is small. Accordingly, the small water vapor-BET/nitrogen-BET specific surface area ratio of the catalyst of the present invention suppresses excessive penetration by water into the pores of the catalyst of the present invention, and/or facilitates discharge of water generated in the pores through a chemical reaction to the outside of the pores.

At a relative pressure of the nitrogen adsorption isotherm of the catalyst of the present invention within the range of 0.4 or more and 0.6 or less, the catalyst of the present invention exhibits a maximum value of the ratio of the nitrogen adsorption amount of the desorption-side isotherm to the nitrogen adsorption amount of the adsorption-side isotherm (hereinafter referred to as "$N_2$ desorption/adsorption amount ratio") of 1.05 or less.

That is, in the nitrogen adsorption isotherm obtained by the nitrogen adsorption method (more specifically, BET method) of the catalyst of the present invention, the $N_2$ desorption/adsorption amount ratio obtained by dividing the nitrogen adsorption amount of the desorption-side isotherm by the nitrogen adsorption amount of the adsorption-side isotherm falls within the range of 1.05 or less at all measurement points at each of which a relative pressure (P/P$_0$), which is the ratio of an adsorption equilibrium pressure (P) to a saturated vapor pressure (P$_0$), falls within the range of 0.4 or more and 0.6 or less. The $N_2$ desorption/adsorption amount ratio takes a value of 1.00 or more because of the measurement principle thereof.

The maximum value of the $N_2$ desorption/adsorption amount ratio of the catalyst of the present invention is preferably 1.04 or less, more preferably 1.03 or less, still more preferably 1.02 or less, and particularly preferably 1.01 or less.

The maximum value of the $N_2$ desorption/adsorption amount ratio of the catalyst of the present invention falling within the above-mentioned ranges means that the nitrogen adsorption isotherm of the catalyst of the present invention shows substantially no hysteresis, and indicates that the pores of the catalyst of the present invention have high interconnectivity (that the catalyst of the present invention has many interconnected pores). That is, in the catalyst of the present invention, some of the catalyst metal particles are supported in the pores of the carbon carrier, but the pores supporting the catalyst metal particles maintain interconnectivity.

In the catalyst of the present invention, the proportion of the number of catalyst metal particles supported at a position having a depth of 20 nm or more from the outer surface of the carbon carrier to the total number of catalyst metal particles supported on the carbon carrier (hereinafter referred to as "catalyst metal supported proportion at a depth of 20 nm or more") is 11% or more.

The catalyst metal supported proportion at 20 nm or more depth of the catalyst of the present invention is calculated by the following equation: "catalyst metal supported proportion at a depth of 20 nm or more" of a catalyst of the present invention (%)="number of catalyst metal particles supported at position having depth of 20 nm or more from outer surface of the carbon carrier"÷"total number of catalyst metal particles supported on the carbon carrier"×100.

The total number of catalyst metal particles supported on the carbon carrier in the catalyst of the present invention is the sum of the number of catalyst metal particles supported on the outer surface of the carbon carrier and the number of catalyst metal particles supported inside the carbon carrier.

The number of catalyst metal particles supported at a position having a depth of 20 nm or more from the outer surface of the carbon carrier in the catalyst of the present invention is equal to a number obtained by subtracting the number of catalyst metal particles supported at a position having a depth of less than 20 nm from the outer surface of the carbon carrier from the number of catalyst metal particles supported inside the carrier.

The "catalyst metal supported proportion at a depth of 20 nm or more" of the catalyst of the present invention is, for example, preferably 12% or more, more preferably 13% or more, still more preferably 14% or more, and particularly preferably 158 or more. The upper limit value of the "catalyst metal supported proportion at a depth of 20 nm or more" of the catalyst of the present invention is not particularly limited, but the proportion may be, for example, 50% or less. The "catalyst metal supported proportion at a depth of 20 nm or more" of the catalyst of the present invention is obtained by electron beam tomography.

The catalyst metal particles supported in pores at a position having a depth of 20 nm or more from the outer surface of the carbon carrier are less liable to be deteriorated compared to the catalyst metal particles supported on the outer surface and the catalyst metal particles supported at a position closer to the outer surface. Accordingly, the fact that the "catalyst metal supported proportion at a depth of 20 nm or more" of the catalyst of the present invention is large, contributes to the catalytic activity and durability of the catalyst of the present invention.

In the catalyst of the present invention, the proportion of the number of catalyst metal particles supported on the outer surface of the carbon carrier to the total number of catalyst metal particles supported on the carbon carrier (hereinafter referred to as "catalyst metal supported proportion at outer surface") may be, for example, 40% or less, and is preferably 33% or less, more preferably 32% or less, still more preferably 31% or less, and particularly preferably 30% or less. The lower limit value of the catalyst metal supported proportion at an outer surface of the catalyst of the present invention is not particularly limited, but the proportion may be, for example, 5% or more. The catalyst metal supported proportion at outer surface of the catalyst of the present invention is obtained by electron beam tomography.

The catalyst metal supported proportion at outer surface of the catalyst of the present invention falling within the above-mentioned ranges indicates that many of the catalyst metal particles included in the catalyst of the present invention are supported inside the carbon carrier. The catalyst metal particles supported inside the carbon carrier are less liable to be deteriorated compared to the catalyst metal particles supported on the outer surface of the carbon carrier. Accordingly, the small catalyst metal supported proportion at outer surface of the catalyst of the present invention contributes to the catalytic activity and durability of the catalyst of the present invention.

In the catalyst of the present invention, the proportion of the sum of the number of catalyst metal particles supported on the outer surface of the carbon carrier and the number of catalyst metal particles supported at a position having a depth of 5 nm or less from the outer surface of the carbon carrier, to the total number of catalyst metal particles supported on the carbon carrier (hereinafter referred to as "catalyst metal supported proportion at outer surface+a depth of 5 nm or less"), may be, for example, 60% or less, and is preferably 58% or less, more preferably 54% or less, still more preferably 52% or less, and particularly preferably 50% or less. The lower limit value of the "catalyst metal supported proportion at outer surface+a depth of 5 nm or less" of the catalyst of the present invention is not particularly limited, but the proportion may be, for example, 10% or more. The "catalyst metal supported proportion at outer surface+a depth of 5 nm or less" of the catalyst of the present invention is obtained by electron beam tomography.

The catalyst of the present invention may include catalyst metal particles that are partially buried in a pore inner surface of the carbon carrier. In this case, at least some of the catalyst metal particles supported on the carbon carrier are supported in the pores of the carbon carrier, and each thereof is partially buried in the pore inner surface.

The relationship between the sizes of the pores of a carbon carrier and the sizes and arrangement of catalyst metal particles supported on the carbon carrier is schematically illustrated in FIG. 1. It should be noted that FIG. 1 is merely a schematic explanatory view, and for example, the relative relationship of the size of the carbon carrier with the sizes of the pores and the catalyst metal particles, and the shapes of the pores of the carbon carrier, are not necessarily identical to actual ones.

In FIG. 1, a catalyst metal particle D is supported in a pore of the carbon carrier, and part thereof is buried in the inner surface of the pore. The inclusion in the catalyst of the present invention of catalyst metal particles that are partially buried in the pore inner surface like the catalyst metal particle D, is supported by, for example, the following: the catalyst metal particle diameter/pore diameter ratio of the catalyst of the present invention is 0.70 or more and 1.30 or less, the maximum value of the $N_2$ desorption/adsorption amount ratio of the catalyst of the present invention is 1.05 or less, and the catalyst metal supported proportion at outer surface is 33% or less.

That is, in the catalyst of the present invention, when, although more catalyst metal particles having particle diameters close to the diameters of the pores of the carbon carrier are supported inside the carbon carrier than on the outer surface of the carbon carrier, the pores in which the catalyst metal particles are supported have interconnectivity, it is strongly suggested that the catalyst of the present invention includes catalyst metal particles each of which is partially buried in the pore inner surface.

Specifically, as illustrated in FIG. 1, when a catalyst metal particle A having a particle diameter close to the diameter of a pore of the carbon carrier is supported inside the carbon carrier and is not buried in the inner surface of the pore, the catalyst metal particle A blocks up the pore, and thus the interconnectivity of the pore is lost.

A catalyst metal particle B having a sufficiently smaller particle diameter than the diameter of a pore of the carbon carrier does not block up the pore even when supported inside the carbon carrier, and hence, even when the catalyst metal particle B is not buried in the inner surface of the pore, the interconnectivity of the pore is maintained. A catalyst metal particle B' having a particle diameter sufficiently larger than the diameters of the pores of the carbon carrier is supported on the outer surface of the carbon carrier, and hence the interconnectivity of the pore is maintained. In addition, when a catalyst metal particle C having a particle diameter close to the diameter of a pore of the carbon carrier is supported on the outer surface of the carbon carrier, the interconnectivity of the pore is maintained.

In contrast to the foregoing, when the interconnectivity of the pore is maintained even though the catalyst metal particle D having a particle diameter close to the diameter of a pore of the carbon carrier is supported inside the carbon carrier, it is conceived that the catalyst metal particle D is partially buried in the inner surface of the pore.

In the catalyst of the present invention, the partial burial of the catalyst metal particles in the pore inner surface of the carbon carrier contributes to an improvement in stability of the catalyst metal particles in the pores.

The catalyst of the present invention has both high catalytic activity and durability by virtue of satisfying all of the above-mentioned condition for the catalyst metal particle diameter/pore diameter ratio, the above-mentioned condition for the $N_2$ desorption/adsorption amount ratio, and the above-mentioned condition for the "catalyst metal supported proportion at a depth of 20 nm or more".

Specifically, for example, in a fuel cell including a cathode containing the catalyst of the present invention, the interconnectivity of the pores in the carbon carrier of the catalyst of the present invention allows the diffusion of gas and the transport of protons to be effectively performed, and besides, the partial burial of the catalyst metal particles in the pore inner surface, and the specific proportion of the catalyst metal particles supported at a position having a depth of 20 nm or more from the outer surface of the carbon carrier enable high catalytic activity to be effectively maintained while the poisoning of the catalyst metal particles is effectively prevented.

The catalyst of the present invention may have a tortuosity of 1.90 or less, preferably 1.85 or less, particularly preferably 1.80 or less. The lower limit value of the tortuosity of the catalyst of the present invention is not particularly limited, but the tortuosity may be, for example, 1.50 or more. The tortuosity of the catalyst of the present invention is obtained by electron beam tomography.

When the tortuosity of the catalyst of the present invention falls within the above-mentioned ranges, the diffusion and transport of substances (e.g., the diffusion of gas and the transport of protons in the pores of the catalyst of the present invention included in the cathode of a fuel cell) are effectively performed in the interconnected pores of the catalyst of the present invention.

The catalyst of the present invention preferably contains nitrogen. In this case, the catalyst of the present invention preferably includes a carbon carrier containing nitrogen. The nitrogen content of the catalyst of the present invention may be, for example, 0.05 wt % or more, and is preferably 0.10 wt % or more, more preferably 0.15 wt % or more, still more preferably 0.20 wt % or more, and particularly preferably 0.25 wt % or more. The upper limit value of the nitrogen content of the catalyst of the present invention is not particularly limited, but the nitrogen content may be, for example, 4.00 wt % or less. The nitrogen content of the catalyst of the present invention is obtained by elemental analysis (combustion method).

The catalyst of the present invention may have a carbon structure that exhibits a half width at half maximum (hereinafter referred to as "Raman D half width at half maximum") of 85.0 $cm^{-1}$ or less of a D band having a peak top in the vicinity of 1,340 $cm^{-1}$ (e.g., in the range of 1,270 $cm^{-1}$ or more and 1,450 $cm^{-1}$ or less) in a Raman spectrum obtained by Raman spectroscopy. In this case, the Raman D half width at half maximum of the catalyst of the present invention is preferably 75.0 $cm^{-1}$ or less, more preferably 70.0 $cm^{-1}$ or less, particularly preferably 65.0 $cm^{-1}$ or less. The lower limit value of the Raman D half width at half maximum of the catalyst of the present invention is not particularly limited, but the D half width at half maximum may be, for example, 20.0 $cm^{-1}$ or more, and is preferably 25.0 $cm^{-1}$ or more, particularly preferably 30.0 $cm^{-1}$ or more. The Raman D half width at half maximum of the catalyst of the present invention may be specified by arbitrarily combining any one of the above-mentioned lower limit values and any one of the above-mentioned upper limit values.

In the Raman spectrum, the D band is a component derived from a curved structure including defects and edges. The half width at half maximum of the D band indicates the crystallinity of the curved structure contained in the carbon structure. That is, the small half width at half maximum of the D band means that the crystallinity of the curved structure is high. Because of this, the half width at half maximum of the Raman D half width at half maximum of the carbon structure (specifically, the carbon structure of the carbon carrier) of the catalyst of the present invention falling within the above-mentioned ranges means that the carbon structure contains a curved structure having relatively high crystallinity. The fact that the catalyst of the present invention includes a carbon structure containing a curved structure having relatively high crystallinity contributes to excellent durability and oxidation resistance of the catalyst of the present invention.

The catalyst of the present invention exhibits catalytic activity derived from the catalyst metal particles supported on the carbon carrier. In addition, when the carbon carrier itself exhibits catalytic activity alone (when the carbon carrier is a carbon catalyst), the catalyst of the present invention exhibits catalytic activity derived from the carbon carrier itself as well as the catalytic activity derived from the catalyst metal particles.

The catalytic activity to be exhibited by the catalyst of the present invention is not particularly limited, but is, for example, preferably reduction activity and/or oxidation activity, more preferably oxygen reduction activity and/or hydrogen oxidation activity, particularly preferably at least oxygen reduction activity.

A method of producing the catalyst of the present invention (hereinafter referred to as "method of the present invention") includes supporting catalyst metal particles on a carbon carrier. A method of supporting the catalyst metal particles on the carbon carrier is not particularly limited as long as the effect of the present invention is obtained, but is preferably a gas-phase reduction method. That is, the method of the present invention includes subjecting a carbon carrier having supported thereon a metal compound serving as a precursor of catalyst metal particles to gas-phase reduction treatment to form the catalyst metal particles supported on the carbon carrier.

The method of the present invention preferably includes: a first step of subjecting a carbon carrier having supported thereon a metal compound serving as a precursor of catalyst metal particles to gas-phase reduction treatment to form the catalyst metal particles supported on the carbon carrier; and a second step of heating the carbon carrier having supported thereon the catalyst metal particles in an inert atmosphere after the first step.

In this case, by performing the second step involving performing heating treatment in an inert atmosphere subsequently to the first step involving performing gas-phase reduction treatment, for example, excessive aggregation of the catalyst metal particles and/or excessive migration of the catalyst metal particles from the inside of the carbon carrier to the outer surface thereof can be effectively suppressed.

A method of supporting the metal compound serving as a precursor of catalyst metal particles (hereinafter referred to as "precursor compound") on the carbon carrier is not particularly limited, but for example, a method involving mixing the carbon carrier and the precursor compound in a liquid phase is preferably used. Specifically, for example, the carbon carrier is immersed in a solution containing the precursor compound to impregnate the pores of the carbon carrier with the precursor compound.

The precursor compound is not particularly limited as long as the precursor compound forms a catalyst metal for forming the catalyst metal particles when reduced. That is, when noble metal particles are supported as the catalyst metal particles on the carbon carrier, a noble metal compound that forms the noble metal particles through reduction treatment is used as the precursor compound.

Specifically, when Pt particles are supported as the catalyst metal particles on the carbon carrier, for example, one or more kinds selected from the group consisting of: a platinic acid salt (e.g., one or more kinds selected from the group consisting of: chloroplatinic acid ($H_2PtCl_6$); and dinitrodiamine platinum nitric acid ($Pt(NH_3)_2(NO_2)_2$)); and bis (acetylacetonato)platinum are preferably used as a Pt compound serving as the precursor compound.

The carbon carrier having supported thereon the precursor compound, which is to be subjected to the gas-phase reduction treatment in the first step, is preferably a dry solid. That is, for example, when the precursor compound is supported on the carbon carrier in a liquid phase, the carbon carrier having supported thereon the precursor compound is obtained as a solid by drying a solution containing the carbon carrier and the precursor compound.

In the gas-phase reduction treatment, the carbon carrier having supported thereon the precursor compound is heated in a reducing atmosphere. The reducing atmosphere in the gas-phase reduction treatment is an atmosphere containing a reducing gas. The reducing gas is not particularly limited as long as the effect of the present invention is obtained, but for example, one or more kinds selected from the group consisting of: a hydrogen gas; an ammonia gas; and a hydrocarbon gas (e.g., one or more hydrocarbon gases selected from the group consisting of: a methane gas; a propane gas; and a butane gas) are preferably used.

The content of the reducing gas in the reducing atmosphere (when the atmosphere contains two or more kinds of reducing gases, the sum of the contents of the two or more kinds of reducing gases) is not particularly limited as long as the content falls within a range in which the effect of the present invention is obtained, but may be, for example, 1 vol % or more (1 vol % or more and 100 vol % or less), and is preferably 5 vol % or more, more preferably 10 vol % or more, and particularly preferably 20 vol % or more.

A temperature at which the carbon carrier having supported thereon the precursor compound is heated in the gas-phase reduction treatment (hereinafter referred to as "first heating temperature") is not particularly limited as long as the first heating temperature falls within a range in which the effect of the present invention is obtained, but may be, for example, 250° C. or more, and is preferably 300° C. or more, more preferably 700° C. or more, still more preferably 775° C. or more, and particularly preferably 800° C. or more. The upper limit value of the first heating temperature is not particularly limited, but the first heating temperature may be, for example, 1,200° C. or less, and is preferably 1,100° C. or less, and particularly preferably 1,000° C. or less. The first heating temperature may be specified by arbitrarily combining any one of the above-mentioned lower limit values and any one of the above-mentioned upper limit values.

A period of time for which the carbon carrier having supported thereon the precursor compound is heated at the above-mentioned first heating temperature in the gas-phase reduction treatment (hereinafter referred to as "first heating time") is not particularly limited as long as the first heating time falls within a range in which the effect of the present invention is obtained, but may be, for example, 1 minute or more, and is preferably 5 minutes or more, and particularly preferably 10 minutes or more. The upper limit value of the first heating time is not particularly limited, but the first heating time may be, for example, 180 minutes or less, and is preferably 60 minutes or less, particularly preferably 40 minutes or less. The first heating time may be specified by arbitrarily combining any one of the above-mentioned lower limit values and any one of the above-mentioned upper limit values.

In the second step, the carbon carrier supporting the catalyst metal particles formed by the gas-phase reduction treatment in the first step is subjected to heating treatment in an inert atmosphere. The inert atmosphere is an atmosphere mainly formed of an inert gas. The inert gas is not particularly limited, but is preferably, for example, one or more kinds selected from the group consisting of: a nitrogen gas; an argon gas; and a helium gas.

The content of the inert gas in the inert atmosphere (when the atmosphere contains two or more kinds of inert gases, the sum of the contents of the two or more kinds of inert gases) may be, for example, 95 vol % or more (95 vol % or more and 100 vol % or less), and is preferably 98 vol % or more, more preferably 99 vol % or more, and particularly preferably 99.5 vol % or more.

The inert atmosphere is substantially free of a reducing gas. The content of the reducing gas in the inert atmosphere may be 1 vol % or less, and is preferably 0.5 vol % or less, particularly preferably 0 volt. The carbon carrier supporting the catalyst metal particles, which is to be heated in the inert atmosphere in the second step, is preferably a carbon carrier which does not generate reducing gas through the heating in the second step (e.g., through thermal decomposition).

It is preferred that the inert atmosphere be substantially free of oxygen. That is, the content of oxygen in the inert atmosphere may be, for example, 3 vol % or less, and is preferably 1 vol % or less, particularly preferably 0 vol % or less.

The carbon carrier having supported thereon the catalyst metal particles, which is to be heated in the inert atmosphere in the second step, is preferably a dry solid. That is, for example, when the carbon carrier having supported thereon the catalyst metal particles is obtained as a solid by the gas-phase reduction treatment in the first step, in the second step, the carbon carrier having supported thereon the catalyst metal particles is heated in the inert atmosphere while remaining a solid, without being immersed in a liquid phase.

A temperature at which the carbon carrier having supported thereon the catalyst metal particles is heated in the second step (hereinafter referred to as "second heating temperature") may be, for example, 500° C. or more, and is preferably 600° C. or more, more preferably 700° C. or more, still more preferably 750° C. or more, particularly preferably 800° C. or more. The upper limit value of the second heating temperature is not particularly limited, but the second heating temperature may be, for example, 1,200° C. or less, and is preferably 1,100° C. or less, particularly preferably 1,000° C. or less. The second heating temperature may be specified by arbitrarily combining any one of the above-mentioned lower limit values and any one of the above-mentioned upper limit values.

A period of time for which the carbon carrier having supported thereon the catalyst metal particles is heated at the above-mentioned second heating temperature in the second step (hereinafter referred to as "second heating time") is not particularly limited as long as the second heating time falls within a range in which the effect of the present invention is obtained, but may be, for example, 1 minute or more, and is preferably 10 minutes or more, particularly preferably 20 minutes or more. The upper limit value of the second heating time is not particularly limited, but the second heating time may be, for example, 240 minutes or less, and is preferably 120 minutes or less, particularly preferably 60 minutes or less. The second heating time may be specified by arbitrarily combining any one of the above-mentioned lower limit values and any one of the above-mentioned upper limit values.

A relatively high temperature is preferably adopted as each of the first heating temperature in the first step and the second heating temperature in the second step. That is, the first heating temperature and the second heating temperature are, for example, each preferably 500° C. or more (e.g., 500° C. or more and 1,200° C. or less), each more preferably 700° C. or more (e.g., 700° C. or more and 1,200° C. or less), each still more preferably 775° C. or more (e.g., 775° C. or more and 1,200° C. or less), each particularly preferably 800° C. or more (e.g., 800° C. or more and 1,200° C. or less).

When a relatively high temperature is adopted as each of the first heating temperature and the second heating temperature, the burial of the catalyst metal particles in the pore inner surface of the carbon carrier can be allowed to proceed effectively while excessive aggregation of the catalyst metal particles is effectively prevented.

A temperature close to the first heating temperature in the first step is preferably adopted as the second heating temperature in the second step. That is, a difference between the first heating temperature and the second heating temperature is, for example, preferably 300° C. or less, more preferably 200° C. or less, still more preferably 150° C. or less, particularly preferably 100° C. or less.

It is preferred to perform the second step without significantly decreasing the temperature of the atmosphere after the gas-phase reduction treatment in the first step. That is, between the end of the heating at the first heating temperature in the first step and the start of the heating at the second heating temperature in the second step, the temperature of the atmosphere where the carbon carrier supporting the catalyst metal particles is kept is preferably not decreased from the first heating temperature by 800° C. or more, more preferably not decreased by 500° C. or more, still more preferably not decreased by 200° C. or more, particularly preferably not decreased by 100° C. or more.

In the method of the present invention, it is preferred that the first step be performed in a predetermined container, and then, while the carbon carrier having supported thereon the catalyst metal particles is kept in the container, the reducing atmosphere in the container be replaced with the inert atmosphere and the second step be performed in the container.

When, as described above, the first step and the second step are continuously performed in the same container, the catalyst metal particles can be partially buried in the pore inner surface of the carbon carrier without oxidizing the surfaces of the catalyst metal particles. That is, while the durability of the catalyst metal particles is maintained, the catalyst metal particles can be partially buried in the pore inner surface of the carbon carrier.

In the method of the present invention, liquid-phase reduction treatment of the carbon carrier having supported thereon the precursor compound may not be performed before the first step and/or before the second step.

Herein, the "liquid-phase reduction" is a method involving reducing the precursor compound supported on the carbon carrier in a liquid phase to form catalyst metal particles supported on the carbon carrier. Specifically, in the liquid-phase reduction treatment, for example, a reducing agent is added to a solution containing the carbon carrier supporting the precursor compound, and the mixture is kept at a predetermined temperature for a predetermined period of time, to thereby form catalyst metal particles supported on the carbon carrier in the solution.

An electrode according to an embodiment of the present invention (hereinafter referred to as "electrode of the present invention") includes the catalyst of the present invention. That is, the electrode of the present invention is, for example, a battery electrode including an electrode base material and the catalyst of the present invention supported on the electrode base material. The electrode of the present invention is, for example, an electrode for a fuel cell (e.g., a polymer electrolyte fuel cell), an air cell, a water electrolyzer (e.g., a polymer electrolyte water electrolyzer), a redox flow battery, or a halogen battery.

In addition, the electrode of the present invention is, for example, a cathode or an anode, preferably a cathode. That is, the electrode of the present invention is a cathode or an anode of a fuel cell, an air cell, a water electrolyzer, a redox flow battery, or a halogen battery, preferably a fuel cell cathode, an air cell cathode, a water electrolyzer cathode, a redox flow battery cathode, or a halogen battery cathode, more preferably a fuel cell cathode or an air cell cathode, particularly preferably a fuel cell cathode.

A battery according to an embodiment of the present invention (hereinafter referred to as "battery of the present invention") includes the electrode of the present invention. That is, the battery of the present invention is, for example, a fuel cell (e.g., a polymer electrolyte fuel cell), an air cell, a redox flow battery, or a halogen battery including the electrode of the present invention. The battery of the present invention may include a membrane electrode assembly (MEA) including the electrode of the present invention.

The battery of the present invention is a battery including the electrode of the present invention as a cathode or an anode, preferably a battery including the electrode of the present invention as a cathode. That is, the battery of the present invention is a fuel cell, an air cell, a redox flow battery, or a halogen battery including the electrode of the present invention as a cathode or an anode, preferably a fuel cell, an air cell, a redox flow battery, or a halogen battery including the electrode of the present invention as a cathode, more preferably a fuel cell or an air cell including the electrode of the present invention as a cathode, particularly preferably a fuel cell including the electrode of the present invention as a cathode.

Next, specific Examples according to the embodiments of the present invention are described.

EXAMPLES

[Carbon Carrier A]

1.0 g of polyacrylonitrile (PAN), 1.0 g of 2-methylimidazole, 6.0 g of zinc chloride ($ZnCl_2$), and 30 g of dimethylformamide were mixed. The solvent was removed from the resultant mixture by drying. The dried mixture was heated in the atmosphere to be subjected to infusibilization at 250° C.

The carbonization was performed by heating and keeping the infusibilized mixture at 1,500° C. under a gauge pressure of 0.90 MPa in a nitrogen atmosphere. Dilute hydrochloric acid was added to the carbonized material obtained by the carbonization, and the mixture was stirred. After that, the suspension containing the carbonized material was filtered using a filtration membrane, and the carbonized material was washed with distilled water until the filtrate became neutral. In this manner, metal removal treatment by washing with an acid was performed.

The carbonized material after the metal removal treatment was pulverized with a fine pulverizer until a particle diameter median value thereof reached 0.4 μm or less. The carbonized material after the pulverization was vacuum-dried to remove water. After that, the carbonized material was subjected to heating treatment at 300° C. in a nitrogen atmosphere. The carbonized material thus obtained was used as a carbon carrier A.

[Carbon Carrier B]

1.0 g of PAN, 1.0 g of 2-methylimidazole, 6.0 g of $ZnCl_2$, 0.18 g of iron(III) chloride hexahydrate ($FeCl_3 \cdot 6H_2O$), and 30 g of dimethylformamide were mixed. The solvent was removed from the resultant mixture by drying. The dried mixture was heated in the atmosphere to be subjected to infusibilization at 250° C.

The infusibilized mixture was carbonized by heating and keeping the infusibilized mixture at 1,300° C. under a gauge pressure of 0.90 MPa in a nitrogen atmosphere. Dilute hydrochloric acid was added to the carbonized material obtained by the carbonization, and the mixture was stirred. After that, the suspension containing the carbonized material was filtered using a filtration membrane, and the carbonized material was washed with distilled water until the filtrate became neutral. In this manner, metal removal treatment by washing with an acid was performed.

The carbonized material after the metal removal treatment was pulverized with a fine pulverizer until a particle diameter median value thereof reached 1 μm or less. The carbonized material after the pulverization was vacuum-dried to remove water. After that, the carbonized material was subjected to heating treatment at 300° C. in a nitrogen atmosphere. Further, the carbonized material after the heating treatment was heated and kept at 900° C. under a stream of an ammonia gas, and thus the carbonized material was subjected to nitrogen doping treatment and activation treatment. The carbonized material thus obtained was used as a carbon carrier B.

[Carbon Carrier C]

Commercially available Ketjen Black EC600JD (manufactured by Lion Specialty Chemicals Co., Ltd.) was used as a carbon carrier C.

[Carbon Carrier D]

1.0 g of PAN, 1.0 g of 2-methylimidazole, 6.0 g of $ZnCl_2$, and 30 g of dimethylformamide were mixed. The solvent was removed from the resultant mixture by drying. The dried mixture was heated in the atmosphere to be subjected to infusibilization at 250° C.

The infusibilized mixture was carbonized by heating and keeping the infusibilized mixture at 1,500° C. under normal pressure in a nitrogen atmosphere. Dilute hydrochloric acid was added to the carbonized material obtained by the carbonization, and the mixture was stirred, After that, the suspension containing the carbonized material was filtered through use of a filtration membrane, and the carbonized material was washed with distilled water until the filtrate became neutral. In this manner, metal removal treatment by washing with an acid was performed.

The carbonized material after the metal removal treatment was pulverized with a fine pulverizer until a particle diameter median value thereof reached 0.4 μm or less. The carbonized material after the pulverization was vacuum-dried to remove water. After that, the carbonized material was subjected to heating treatment at 300° C. in a nitrogen atmosphere. The carbonized material thus obtained was used as a carbon carrier D.

Example 1

A metal-supported catalyst was produced by applying a method A of supporting catalyst metal particles to the carbon carrier A. Specifically, the carbon carrier A and an aqueous solution, which contained chloroplatinic acid ($H_2PtCl_6$) serving as a platinum precursor and cobalt chloride ($CoCl_2$) serving as a precursor of an alloy component, were mixed for 18 hours. After that, the resultant mixed liquid was dried in air at 100° C., and was further kept in nitrogen at 150° C. to volatilize the solvent component.

The resultant solid was subjected to heating treatment in a hydrogen atmosphere (hydrogen gas: 100 vol %) at 825° C. for 20 minutes (gas-phase reduction treatment). Subsequently, while the temperature of the atmosphere was maintained within the range of from 820° C. to 830° C., the hydrogen atmosphere was replaced with a nitrogen atmosphere (nitrogen gas: 100 vol %), and the solid was subjected to heating treatment in the nitrogen atmosphere at 825° C. for 40 minutes.

In order to remove unnecessary metals other than platinum alloys from the metal-supported catalyst thus obtained, the metal-supported catalyst and a 10% nitric acid solution were mixed for 2 hours. After that, the metal-supported catalyst and the acid solution were separated by filtration, and further, the metal-supported catalyst was washed with distilled water until the filtrate became neutral. The metal-supported catalyst after the washing was dried in a vacuum at 60° C. to remove water.

After that, in order to remove nitric acid, the metal-supported catalyst was subjected to heating treatment in nitrogen at 300° C. Further, in order to reduce and remove platinum oxides, the metal-supported catalyst was subjected to heating treatment in nitrogen at 700° C. Thus, a platinum alloy-supported catalyst formed of the carbon carrier A and platinum alloy particles supported on the carbon carrier A was obtained. The supported amount of platinum in the finally obtained metal-supported catalyst (proportion of the weight of platinum contained in the metal-supported catalyst to the weight of the metal-supported catalyst) was 40 wt %. In addition, the noble metal/non-noble metal molar ratio (specifically, Pt/Co molar ratio) in the metal-supported catalyst was 7.0.

Example 2

A metal-supported catalyst was produced by applying a method B of supporting catalyst metal particles to the carbon carrier A. Specifically, the carbon carrier A and an aqueous solution containing $H_2PtCl_6$ were mixed for 18 hours. After that, the resultant mixed liquid was dried in air at 100° C., and was further kept in nitrogen at 150° C. to volatilize the solvent component.

The resultant solid was subjected to heating treatment in a hydrogen atmosphere (hydrogen gas: 100 vol %) at 825° C. for 20 minutes. Subsequently, while the temperature of the atmosphere was maintained within the range of from 820° C. to 830° C., the hydrogen atmosphere was replaced with a nitrogen atmosphere (nitrogen gas: 100 vol %), and the solid was subjected to heating treatment in the nitrogen atmosphere at 825° C. for 40 minutes. Thus, a platinum-supported catalyst formed of the carbon carrier A and pure platinum particles supported on the carbon carrier A was obtained. The supported amount of platinum in the finally obtained metal-supported catalyst was 40 wt %.

Example 3

A metal-supported catalyst was produced by applying a method C of supporting catalyst metal particles to the carbon carrier A. Specifically, the carbon carrier A and an aqueous solution containing $H_2PtCl_6$ were mixed for 18 hours. After that, the resultant mixed liquid was dried in air at 100° C., and was further kept in nitrogen at 150° C. to volatilize the solvent component.

The resultant solid was subjected to heating treatment in a hydrogen atmosphere (hydrogen gas: 100 vol %) at 825° C. for 30 minutes. Subsequently, while the temperature of the atmosphere was maintained within the range of from 820° C. to 830° C., the hydrogen atmosphere was replaced with a nitrogen atmosphere (nitrogen gas: 100 vol %), and the solid was subjected to heating treatment in the nitrogen atmosphere at 825° C. for 30 minutes. Thus, a platinum-supported catalyst formed of the carbon carrier A and pure platinum particles supported on the carbon carrier A was obtained. The supported amount of platinum in the finally obtained metal-supported catalyst was 40 wt %.

Example 4

A metal-supported catalyst was produced by applying a method D of supporting catalyst metal particles to the carbon carrier B. Specifically, the carbon carrier B and an aqueous solution containing $H_2PtCl_6$ and $CoCl_2$ were mixed for 18 hours. After that, the resultant mixed liquid was dried in air at 100° C., and was further kept in nitrogen at 150° C. to volatilize the solvent component.

The resultant solid was subjected to heating treatment in a hydrogen atmosphere (hydrogen gas: 100 vol %) at 900° C. for 60 minutes. In order to remove unnecessary metals other than platinum alloys from the metal-supported catalyst thus obtained, the metal-supported catalyst and a 10% nitric acid solution were mixed for 2 hours. After that, the metal-supported catalyst and the acid solution were separated by filtration, and further, the metal-supported catalyst was washed with distilled water until the filtrate became neutral. The metal-supported catalyst after the washing was dried in a vacuum at 60° C. to remove water.

After that, in order to remove nitric acid, the metal-supported catalyst was subjected to heating treatment in nitrogen at 300° C. Further, in order to reduce and remove platinum oxides, the metal-supported catalyst was subjected to heating treatment in nitrogen at 700° C. Thus, a platinum alloy-supported catalyst formed of the carbon carrier B and platinum alloy particles supported on the carbon carrier B was obtained. The supported amount of platinum in the finally obtained metal-supported catalyst was 30 wt %. In addition, the noble metal/non-noble metal molar ratio (specifically, Pt/Co molar ratio) in the metal-supported catalyst was 7.0.

Example 5

A metal-supported catalyst was produced by applying a method E of supporting catalyst metal particles to the carbon carrier A. Specifically, a platinum alloy-supported catalyst formed of the carbon carrier A and platinum alloy particles supported on the carbon carrier A was obtained in the same manner as in Example 4 described above except that the carbon carrier A was used instead of the carbon carrier B, and that heating treatment in a hydrogen atmosphere (hydrogen gas: 100 vol %) at 825° C. for 60 minutes was performed instead of the heating treatment in a hydrogen atmosphere at 900° C. for 60 minutes. The supported amount of platinum in the finally obtained metal-supported catalyst was 40 wt %. In addition, the noble metal/non-noble metal molar ratio (specifically, Pt/Co molar ratio) in the metal-supported catalyst was 7.0.

Example 6

A metal-supported catalyst was produced by applying the method A of supporting catalyst metal particles to the carbon carrier B. Specifically, a platinum alloy-supported catalyst formed of the carbon carrier B and platinum alloy particles supported on the carbon carrier B was obtained in the same manner as in Example 1 described above except that the carbon carrier B was used instead of the carbon carrier A. The supported amount of platinum in the finally obtained metal-supported catalyst was 30 wt %. In addition, the noble metal/non-noble metal molar ratio (specifically, Pt/Co molar ratio) in the metal-supported catalyst was 7.0.

Example C1

A metal-supported catalyst was produced by applying the method B of supporting catalyst metal particles to the carbon carrier C. Specifically, a platinum-supported catalyst formed of the carbon carrier C and pure platinum particles supported on the carbon carrier C was obtained in the same manner as in Example 2 described above except that the carbon carrier C was used instead of the carbon carrier A. The supported amount of platinum in the finally obtained metal-supported catalyst was 40 wt %.

Example C2

A commercially available platinum catalyst formed of a carbon carrier having a high specific surface area (specific surface area: from about 800 $m^2/g$ to about 1,200 $m^2/g$) and pure platinum particles serving as catalyst metal particles supported on the carbon carrier was used as a metal-supported catalyst of Example C2. The supported amount of platinum in the metal-supported catalyst was 39 wt %.

Example C3

UNPC40-II (manufactured by Ishifuku Metal Industry Co., Ltd.), which was a commercially available platinum catalyst formed of a carbon carrier having a high specific surface area and pure platinum particles serving as catalyst metal particles supported on the carbon carrier, was used as a metal-supported catalyst of Example C3. The supported amount of platinum in the metal-supported catalyst was 34 wt %.

Example C4

A commercially available platinum catalyst formed of Vulcan XC72R (manufactured by Cabot Corporation) serving as a carbon carrier and pure platinum particles serving as catalyst metal particles supported on the carbon carrier was used as a metal-supported catalyst of Example C4. The supported amount of platinum in the metal-supported catalyst was 42 wt %.

Example C5

A metal-supported catalyst was produced by applying a method F of supporting catalyst metal particles to the carbon carrier A. Specifically, the carbon carrier A and an aqueous solution containing $H_2PtCl_6$ were mixed for 18 hours. Then, ethylene glycol was added as a reducing agent, and the resultant mixed liquid was kept in air at 80° C. for 4 hours, to thereby perform liquid-phase reduction treatment.

After that, the mixed liquid was dried in air at 100° C., and further kept in nitrogen at 150° C. to volatilize the solvent component. Thus, a platinum-supported catalyst formed of the carbon carrier A and pure platinum particles supported on the carbon carrier A was obtained. The supported amount of platinum in the finally obtained metal-supported catalyst was 40 wt %.

Example C6

A metal-supported catalyst was produced by applying a method G of supporting catalyst metal particles to the carbon carrier A. Specifically, a platinum-supported catalyst obtained by volatilizing a solvent component in the same manner as in Example C5 described above was taken out into the atmosphere after the temperature lowered to room temperature. After that, the platinum-supported catalyst was subjected to heating treatment in a hydrogen atmosphere (hydrogen gas: 100 vol %) at 900° C. for 60 minutes. Thus, a platinum-supported catalyst formed of the carbon carrier A and pure platinum particles supported on the carbon carrier A was obtained. The supported amount of platinum in the finally obtained metal-supported catalyst was 40 wt %.

Example C7

A metal-supported catalyst was produced by applying the method A of supporting catalyst metal particles to the carbon carrier D. Specifically, a platinum alloy-supported catalyst formed of the carbon carrier D and platinum alloy particles supported on the carbon carrier D was obtained in the same manner as in Example 1 described above except that the carbon carrier D was used instead of the carbon carrier A, The supported amount of platinum in the finally obtained metal-supported catalyst was 40 wt. In addition, the noble metal/non-noble metal molar ratio (specifically, Pt/Co molar ratio) in the metal-supported catalyst was 7.0.

[Median Diameter of Carbon Carrier]

The median diameter of the carbon carrier was measured. That is, for the carbon carrier not yet supporting the catalyst metal particles, particle size distribution data with a horizontal axis representing a particle diameter (pam) and a vertical axis representing a cumulative relative particle amount (%) was acquired through use of a laser diffraction particle size distribution measuring device, and a particle diameter at which a cumulative relative particle amount became 50% in the particle size distribution data was obtained as the median diameter (μm).

[Nitrogen Contents of Carbon Carrier and Metal-Supported Catalyst: Elemental Analysis (Combustion Method)]

Elemental analysis by a combustion method of the carbon carrier and the metal-supported catalyst was performed to measure each of the nitrogen content of the carbon carrier and the nitrogen content of the metal-supported catalyst. That is, the nitrogen atom content of the carbon carrier not yet supporting the catalyst metal particles, and the nitrogen atom content of the metal-supported catalyst were each measured by the combustion method through use of an organic trace element analyzer (2400II, PerkinElmer Co., Ltd.). Specifically, 2 mg of the carbon carrier or 2 mg of the metal-supported catalyst was analyzed through use of helium as a carrier gas under the conditions of a combustion tube temperature of 980° C. and a reduction tube temperature of 640° C.

Then, the weight of nitrogen atoms contained in the carbon carrier was divided by the weight of the carbon carrier, and the resultant value was multiplied by 100 to calculate the nitrogen atom content (wt %) of the carbon carrier. In addition, similarly, the weight of nitrogen atoms contained in the metal-supported catalyst was divided by the weight of the metal-supported catalyst, and the resultant value was multiplied by 100 to calculate the nitrogen atom content (wt %) of the metal-supported catalyst.

[Metal Content of Metal-Supported Catalyst: Inductively Coupled Plasma Mass Spectrometry (ICP-MS)]

The noble metal content and non-noble metal content of the metal-supported catalyst were measured by ICP-MS. That is, first, 100 mg of the metal-supported catalyst was heated and kept at 800° C. for 3 hours in an atmospheric atmosphere to remove non-metal components in the metal-supported catalyst. Then, the metal contained in the metal-supported catalyst was dissolved by immersing the metal-supported catalyst in 5 mL of aqua regia. Further, distilled water was added to dilute the resultant so that the total weight became 50 mL to obtain a metal solution. After that, the noble metal concentration and non-noble metal concentration of the obtained metal solution were measured through use of a sequential-type plasma emission spectrometer (ICPS-8100, manufactured by Shimadzu Corporation). Then, the noble metal concentration (mg/mb) and non-noble metal concentration (mg/mL) of the metal solution were multiplied by the volume (50 mL) of the metal solution, to thereby obtain the noble metal content (mg) and non-noble metal content (mg) of the metal-supported catalyst. Further, the noble metal content (mg) and non-noble metal content (mg) of the metal-supported catalyst were divided by the weight of the metal-supported catalyst, i.e., 100 mg, and multiplied by 100, to thereby calculate a noble metal content (wt %) and a non-noble metal content (wt %) obtained by ICP-MS.

The metal content (wt %) obtained by ICP-MS of the metal-supported catalyst is the content (wt %) of a metal for forming the catalyst metal particles included in the metal-supported catalyst with respect to the weight of the metal-supported catalyst. That is, when the catalyst metal particles included in the metal-supported catalyst are formed only of a noble metal, the content (wt %) of the noble metal in the metal-supported catalyst is the metal content (wt %) to be obtained by ICP-MS. In addition, when the catalyst metal particles included in the metal-supported catalyst are formed of a noble metal and a non-noble metal, the sum of the content (wt %) of the noble metal and the content (wt %) of the non-noble metal in the metal-supported catalyst is the metal content (wt %) to be obtained by ICP-MS. Accordingly, when a raw material metal of the same kind as a metal for forming the catalyst metal particles is contained inside the skeleton of the carbon carrier, the metal content (wt %) to be obtained by ICP-MS also includes the content (wt %) of the raw material metal. Meanwhile, when the raw material metal of the same kind as the metal for forming the catalyst metal particles is not contained inside the skeleton of the carbon carrier, the metal content (wt %) to be obtained by ICP-MS does not include the content (wt %) of the raw material metal.

[Specific Surface Area, Average Pore Diameter, Pore Volume, and Hysteresis in Adsorption Isotherm of Metal-supported Catalyst: Nitrogen Adsorption Method]

The specific surface area, average pore diameter, pore volume, and hysteresis in an adsorption isotherm by a nitrogen adsorption method of the metal-supported catalyst were measured through use of a specific surface area/pore distribution measuring device (TriStar II 3020, manufactured by Shimadzu Corporation).

That is, first, water adsorbed on the metal-supported catalyst was removed by keeping 0.1 g of the metal-supported catalyst at 100° C. and $6.7 \times 10^{-2}$ Pa for 3 hours. Then, a nitrogen adsorption isotherm at 77 K was obtained by a BET method. The nitrogen adsorption isotherm at 77 K was obtained by measuring a change in amount of nitrogen adsorbed on the metal-supported catalyst in association with a change in pressure of a nitrogen gas at a temperature of 77 K.

Figure 2:
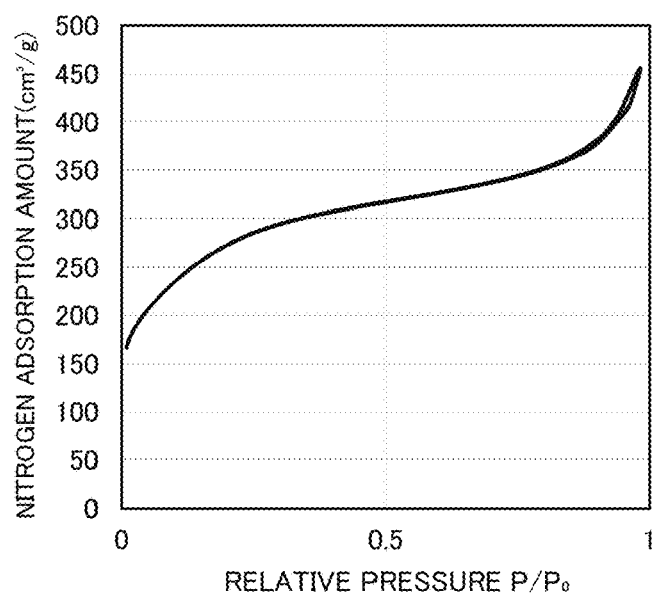
FIG. 2 is an explanatory graph showing an example of a nitrogen adsorption isotherm obtained by a nitrogen adsorption method of a metal-supported catalyst.

In FIG. 2, a nitrogen adsorption isotherm obtained for the metal-supported catalyst of Example 2 is shown as an example of the nitrogen adsorption isotherm obtained at 77 K by the BET method. In the adsorption isotherm shown in FIG. 2, the horizontal axis represents a relative pressure ($P/P_0$), which is the ratio of an adsorption equilibrium pressure (P) to a saturated vapor pressure ($P_0$) ($1.01 \times 10^0$ Pa for nitrogen at 77 K), and the vertical axis represents a nitrogen adsorption amount ($cm^3/g$).

In FIG. 2, an adsorption-side isotherm (adsorption isotherm measured while the relative pressure was increased) and a desorption-side isotherm (adsorption isotherm measured while the relative pressure was reduced) mostly overlapped each other, and there was hardly any hysteresis.

Here, in order to evaluate the magnitude of the hysteresis in the nitrogen adsorption isotherm of the metal-supported catalyst, a $N_2$ desorption/adsorption amount ratio was calculated for all measurement points at each of which the relative pressure ($P/P_0$) of the nitrogen adsorption isotherm fell within the range of 0.4 or more and 0.6 or less.

In addition, the BET specific surface area by the nitrogen adsorption method of the metal-supported catalyst ($m^2$/g-metal-supported catalyst) was obtained from the nitrogen adsorption isotherm at a temperature of 77 K. "/g-metal-supported catalyst" in the unit of a numerical value indicates that the value is per 1 g of the metal-supported catalyst. Then, based on the specific surface area of the metal-supported catalyst and the above-mentioned metal content of the metal-supported catalyst obtained by ICP-MS, the specific surface area ($m^2$/g-carbon carrier) per 1 g of the carbon carrier included in the metal-supported catalyst was calculated. That is, the specific surface area ($m^2$/g-metal-supported catalyst) of the metal-supported catalyst was divided by the weight ratio of the carbon carrier included in the metal-supported catalyst calculated by the following equation, to thereby calculate the specific surface area ($m^2$/g-carbon carrier) per 1 g of the carbon carrier: weight ratio of carbon carrier=1–(metal content (wt %) obtained by ICP-MS)/100.

In addition, the volume of pores each having a pore diameter of 5 nm or more (5 nm or more pore volume) ($cm^3$/g-metal-supported catalyst) and the volume of pores each having a pore diameter of less than 5 nm (less than 5 nm pore volume) ($cm^3$/g-metal-supported catalyst) were obtained by a BJH method from the nitrogen adsorption isotherm at a temperature of 77 K. Then, in the same manner as with the above-mentioned specific surface area, based on the metal content of the metal-supported catalyst obtained by ICP-MS, the 5 nm or more pore volume ($cm^3$/g-carbon carrier) and the less than 5 nm pore volume ($cm^3$/g-carbon carrier) per 1 g of the carbon carrier included in the metal-supported catalyst were calculated.

Further, the less than 5 nm pore volume ($cm^3$/g-carbon carrier) was divided by the 5 nm or more pore volume ($cm^3$/g-carbon carrier), to thereby calculate a less than 5 nm pore/5 nm or more pore volume ratio.

In addition, a total pore volume ($cm^3$/g-metal-supported catalyst) was obtained from an adsorption amount at a point at which the relative pressure $P/P_0$ of the nitrogen adsorption isotherm at a temperature of 77 K was 0.98. Further, in the same manner as with the above-mentioned specific surface area, the total pore volume ($cm^3$/g-carbon carrier) per 1 g of the carbon carrier included in the metal-supported catalyst was calculated based on the metal content of the metal-supported catalyst obtained by ICP-MS. Then, the average pore diameter (nm) of the metal-supported catalyst was calculated by the following equation through use of analysis software (TriStar II 3020) included with a commercially available automatic specific surface area measuring device (TriStar II 3020, manufactured by Shimadzu Corporation); average pore diameter (nm)=$4 \times \{$total pore volume ($cm^3$/g-metal-supported catalyst)$\times 10^{21}\}$/specific surface area ($m^2$/g-metal-supported catalyst)$\times 10^{18}$.

[Specific Surface Area of Metal-supported Catalyst: Water Vapor Adsorption Method]

The BET specific surface area by a water vapor adsorption method of the metal-supported catalyst was measured through use of a specific surface area/pore distribution measuring device (BELSORP-max, manufactured by MicrotracBEL Corp.). That is, the BET specific surface area by the water vapor adsorption method ($m^2$/g-metal-supported catalyst) was calculated by the same method as the above-mentioned nitrogen adsorption method except that the adsorbed species was changed from the nitrogen gas to water vapor, and that the measurement temperature was changed to 298 K. Further, in the same manner as with the case of the specific surface area by the nitrogen adsorption method described above, based on the metal content of the metal-supported catalyst obtained by ICP-MS, the BET specific surface area ($m^2$/g-carbon carrier) by the water vapor adsorption method per 1 g of the carbon carrier contained in the metal-supported catalyst was calculated. Then, the BET specific surface area ($m^2$/g-carbon carrier) by the water vapor adsorption method per 1 g of the carbon carrier was divided by the BET specific surface area ($m^2$/g-carbon carrier) by the nitrogen adsorption method per 1 g of the carbon carrier, to thereby calculate the water vapor-BET/$N_2$-BET specific surface area ratio of the metal-supported catalyst.

[Raman Spectroscopy]

The metal-supported catalyst was analyzed by Raman spectroscopy. A Raman spectrum was measured through use of a HORIBA microlaser Raman spectroscopic measuring device (LabRAM, HORIBA Jobin Yvon). The laser used for the measurement had an excitation wavelength of 532 nm and an output of 50 mW, and measurement was performed through a neutral density filter D3 under the conditions of exposure of 90 seconds×integration of 2 times to obtain a Raman spectrum.

The obtained Raman spectrum was subjected to baseline correction. That is, a straight line connecting the scattering intensity at which a Raman shift ($cm^{-1}$) was in the vicinity of 600 $cm^{-1}$ and the scattering intensity at which a Raman shift ($cm^{-1}$) was in the vicinity of 2,000 $cm^{-1}$ was determined as a baseline, and the baseline was subtracted from each intensity of the scattering spectrum, to thereby perform the baseline correction.

Next, a D band having a peak top in the vicinity of 1,340 cm was identified. Then, a Raman shift ($cm^{-1}$) Bd corresponding to an intensity of half of an intensity Id of the D band was subtracted from a Raman shift ($cm^{-1}$) Ad corresponding to the intensity Id of the D band (intensity of the peak top of the D band), to thereby calculate the half width at half maximum of the D band (hereinafter referred to as "Raman D half width at half maximum") ($cm^{-1}$).

Figure 3:
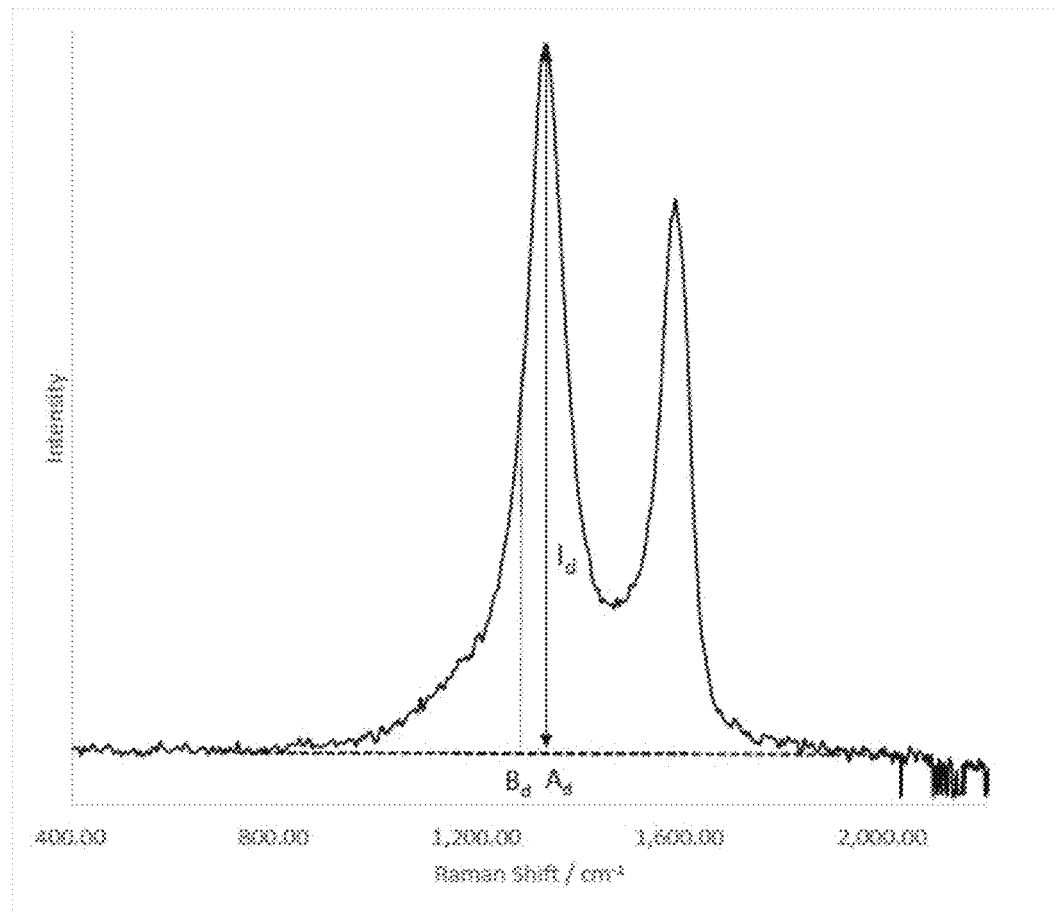
FIG. 3 is an explanatory graph showing an example of a Raman spectrum obtained by Raman spectroscopy of a metal-supported catalyst.

Now, in FIG. 3, there are shown results obtained by analyzing a Raman spectrum obtained by Raman spectroscopy for the metal-supported catalyst of Example 2 as an example of the Raman spectrum. In FIG. 3, the horizontal axis represents a Raman shift ($cm^{-1}$), the vertical axis represents a scattering intensity, the broken line indicates a baseline, Ad represents a Raman shift ($cm^{-1}$) corresponding to the peak top of the D band, and Bd represents a Raman shift ($cm^{-1}$) corresponding to a Raman spectrum exhibiting an intensity of half of the D band intensity Id on a lower wavenumber side from the Ad. In addition, the Raman D half width at half maximum of the metal-supported catalyst is calculated by the following equation: Raman D half width at half maximum ($cm^{-1}$)=Ad ($cm^{-1}$)–Bd ($cm^{-1}$).

[Number-Average Particle Diameter and Volume-Average Particle Diameter of Catalyst Metal Particles: X-ray Diffraction Method (XRD)]

The number-average particle diameter (nm) and volume-average particle diameter (nm) of the catalyst metal particles were measured by an X-ray diffraction method. That is, first, a sample of a powdery metal-supported catalyst was placed in a recess (2 cm×2 cm×0.5 mm (thickness)) of a glass sample plate and pressed with a slide glass. Thus, the sample was uniformly filled into the recess so that the surface of the sample and a reference surface were matched with each other. Then, the glass sample plate was fixed to a wide-angle X-ray diffraction sample table so that the form of the filled sample did not collapse.

Then, powder X-ray diffraction (XRD) measurement was performed through use of an X-ray diffractometer (Rigaku RINT2100/PC, Rigaku Corporation). The voltage and current applied to an X-ray tube were set to 50 kV and 300 mA, respectively. The sampling interval was set to 0.19, the scanning speed was set to 1°/min, and the measurement angle range (2θ) was set to from 5° to 90°. CuKα was used as an incident X-ray. The sample thickness was set to 0.5 mm, and the divergence slit width β was set to ⅔°.

The resultant X-ray diffraction pattern was subjected to peak separation through use of a Gaussian function, and further, a crystallite diameter corresponding to each separated peak was determined through use of Scherrer's equation. The number-average particle diameter of the catalyst metal particles was calculated by weighted averaging of the obtained crystallite diameters using a number, that is, "peak area proportion/crystallite diameter$^3$" as a weight. Meanwhile, the volume-average particle diameter of the catalyst metal particles was calculated by weighted averaging of the obtained crystallite diameters using a volume, that is, "peak area proportion" as a weight.

Now, the method of determining the number-average particle diameter (nm) and the volume-average particle diameter (nm) is more specifically described. When the metal-supported catalyst contains platinum particles (pure platinum particles and/or platinum alloy particles), a platinum (111) diffraction line appears at a position at which a diffraction angle (2θ) is in the vicinity of 40° (for example, in the range of from 36° to 44°) in an X-ray diffraction pattern obtained by powder X-ray diffraction using a CuKα ray.

In this respect, in the metal-supported catalyst containing the carbon carrier and the platinum particles supported on the carbon carrier, a diffraction line having a peak top at a position at which the diffraction angle (2θ) is in the vicinity of 40° appears in the X-ray diffraction pattern. In addition, the diffraction line includes a diffraction line derived from pure platinum and/or a platinum alloy, and a diffraction line derived from the carbon structure of the carbon carrier.

The diffraction line derived from pure platinum is defined as a diffraction line having a peak top at a position at which the diffraction angle (2θ) is 39.6° or more and less than 39.8°. The diffraction line derived from a platinum alloy is defined as a diffraction line having a peak top at a position at which the diffraction angle (2θ) is 39.9° or more and less than 43.0°. The diffraction line derived from the carbon structure of the carbon carrier is defined as a diffraction line having a peak top at a position at which the diffraction angle (2θ) is 43.3° or more and less than 43.7°.

When the metal-supported catalyst contains a plurality of kinds of platinum alloys having different compositions and/or crystal structures, a plurality of diffraction lines derived from the platinum alloys appear. The diffraction angle at which the peak top of the diffraction line derived from the platinum alloy is positioned is determined by the composition and crystal structure thereof. For example, a diffraction line derived from a cobalt-platinum alloy represented by the composition CoPt is defined as a diffraction line having a peak top at a position at which the diffraction angle is 41.1° or more and less than 41.5°. In addition, a diffraction line derived from a cobalt-platinum alloy represented by the composition $CoPt_3$ is defined as a diffraction line having a peak top at a position at which the diffraction angle is 40.1° or more and less than 40.5°. Further, a diffraction line derived from a cobalt-platinum alloy represented by the composition CoPt; is defined as a diffraction line having a peak top at a position at which the diffraction angle is 39.9° or more and less than 40.1°.

In addition, when the metal-supported catalyst contains a plurality of kinds of platinum particles having the same composition and crystal structure and different crystallite diameters, a plurality of diffraction lines each having a peak top at the same diffraction angle position and having different full widths at half maximum appear.

In actuality, in the XRD pattern obtained for the metal-supported catalyst, the (111) diffraction line of platinum appeared at a position at which the diffraction angle (2θ) was in the vicinity of 40°. Accordingly, first, baseline correction was performed. That is, a straight line connecting the diffraction intensity at which the diffraction angle (2θ) was in the vicinity of from 35° to 37° and the diffraction intensity at which the diffraction angle (2θ) was in the vicinity of from 50° to 52° was determined as a baseline, and the baseline was subtracted from each intensity of the diffraction line, to thereby perform the baseline correction.

Next, the diffraction line after the baseline correction was separated into a peak derived from one or more kinds of pure Pt and/or a peak derived from one or more kinds of Pt alloys, and a peak derived from carbon. The separation of the diffraction line was performed by assuming that each of a plurality of peaks obtained by the separation was represented by a Gaussian function and optimizing the intensity of each of the Gaussian functions of the plurality of peaks, the diffraction angle of a peak top, and the full width at half maximum so that a residual square sum obtained by adding, regarding all the diffraction angles, a square of a difference (residue) from the sum of the intensity of the diffraction line and each intensity of the plurality of peaks at each diffraction angle of an XRD pattern became minimum.

Figure 4:
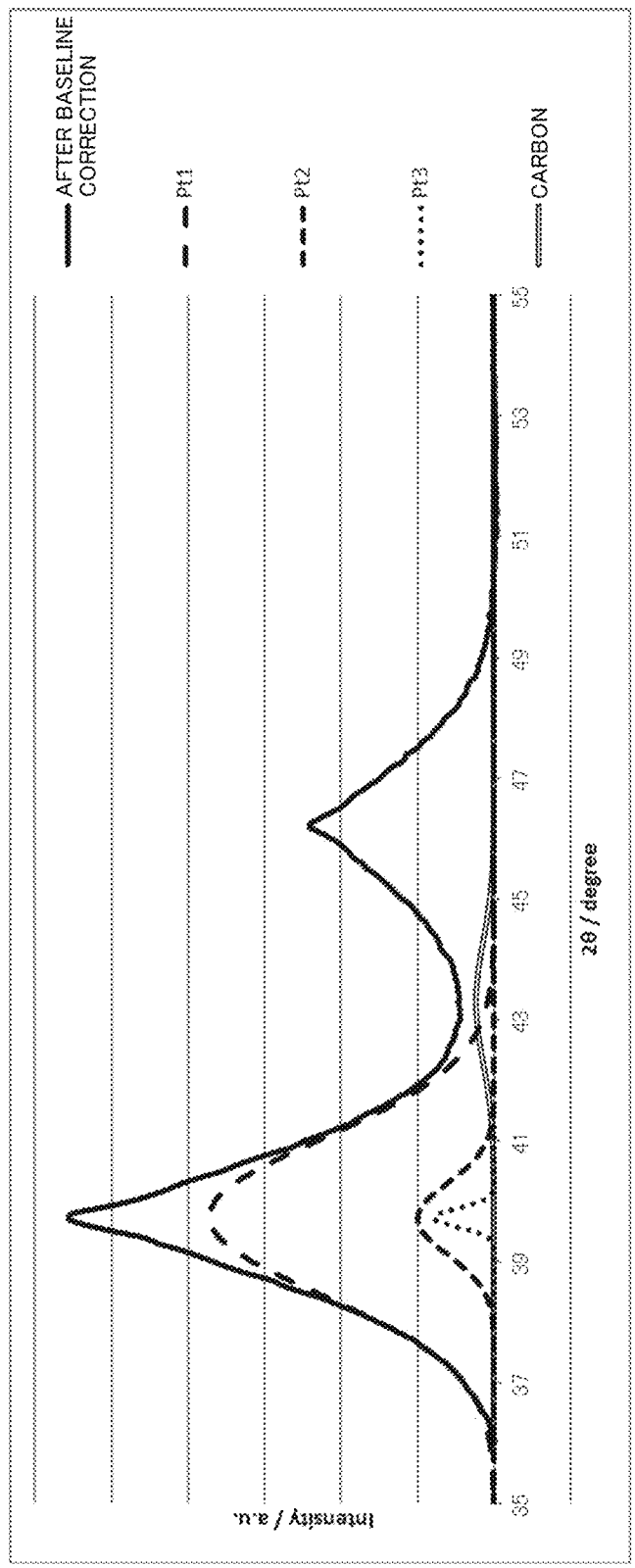
FIG. 4 is an explanatory graph showing an example of results obtained by performing peak separation of a (111) diffraction line of platinum having a peak top at a position at which a diffraction angle (2θ) is in the vicinity of 40° in an X-ray diffraction pattern of a metal-supported catalyst.

In FIG. 4, peak separation results obtained for the metal-supported catalyst of Example 2 are shown as an example of the results obtained by performing the peak separation of the (111) diffraction line of platinum having a peak top at a position at which the diffraction angle (2θ) is in the vicinity of 40° (in the range of from 36° to 44°) in the X-ray diffraction pattern.

In an XRD pattern obtained by powder XRD measurement of the metal-supported catalyst of Example 2, as shown in FIG. 4, a diffraction line having a peak top at a position at which the diffraction angle (2θ) was 39.7° appeared after the baseline correction. The shape of a middle part of this diffraction line was significantly smaller in width than the shape of a lower part, and the shape of an upper part was even smaller in width than the shape of the middle part. Because of this, it was conceived that, when the diffraction angle (2θ) was in the vicinity of 40°, a diffraction line of first platinum having a relatively large full width at half maximum, a diffraction line of second platinum different in crystallite diameter from the first platinum and having a smaller full width at half maximum, and a diffraction line of third platinum different in crystallite diameter from the first and second platinum and having an even smaller full width at half maximum overlapped each other. In addition, the metal-supported catalyst included the carbon carrier, and hence a diffraction line derived from carbon appeared at a diffraction angle (2θ) in the vicinity of 43.5°.

In view of the foregoing, as shown in FIG. 4, the diffraction line having a diffraction angle (2θ) in the vicinity of 40° was separated by the above-mentioned peak separation method into four components formed of a peak derived from the first platinum, a peak derived from the second platinum, a peak derived from the third platinum, and a peak derived from carbon.

In FIG. 4, a diffraction line "after baseline correction" represents a diffraction line obtained by subjecting a diffraction line obtained by XRD measurement to the baseline correction, and a peak of "Pt1", a peak of "Pt2", a peak of "Pt3", and a peak of "carbon" represent a peak derived from the first platinum, a peak derived from the second platinum, a peak derived from the third platinum, and a peak derived from carbon, respectively, which are obtained by the peak separation of the diffraction line "after baseline correction".

Then, the crystallite diameter of each of the first platinum particles, the second platinum particles, and the third platinum particles was calculated by the following Scherrer's equation; crystallite diameter=Kλ/β cos θ. Herein, in the Scherrer's equation, K represents a Scherrer constant (0.94), λ represents the wavelength of a CuKα ray (0.15418 nm), β represents a full width at half maximum (radian), and θ represents a diffraction angle (radian). That is, for example, the crystallite diameter of the first platinum particles was calculated by substituting the diffraction angle and full width at half maximum of the separation peak of "Pt1" in the XRD pattern shown in FIG. 4 into the above-mentioned Scherrer's equation. As a result, the crystallite diameter of the first platinum particles was calculated to be 2.91 nm, the crystallite diameter of the second platinum particles was calculated to be 6.32 nm, and the crystallite diameter of the third platinum particles was calculated to be 24.22 nm.

In addition, the respective areas of the three Pt separation peaks obtained by the above-mentioned peak separation (i.e., the peak area of "Pt1", the peak area of "Pt2", and the peak area of "Pt3") were each divided by the sum of the areas of the three Pt separation peaks and multiplied by 100, to thereby calculate the peak area proportion (%) of each of the Pt separation peaks. As a result, the peak area proportion of the first platinum particles was calculated to be 87.08, the peak area proportion of the second platinum particles was calculated to be 10.8%, and the peak area proportion of the third platinum particles was calculated to be 2.2%.

Then, the volume-average particle diameter of the catalyst metal particles was calculated by weighted averaging using those peak area proportions as weights. Specifically, the volume-average particle diameter of the platinum particles supported on the metal-supported catalyst of Example 2 was calculated to be 3.75 nm by the following equation: volume-average particle diameter (nm)=$\{(2.91 \times 87.0)+(6.32 \times 10.8)+(24.22 \times 2.2)\}/(87.0+10.8+2.2)$, Further, the number-average particle diameter of the catalyst metal particles was calculated by weighted averaging using "peak area proportion/crystallite diameter$^3$" as a weight. Specifically, the number-average particle diameter of the platinum particles supported on the metal-supported catalyst of Example 2 was calculated to be 2.95 nm by the following equation: number-average particle diameter (nm)= $\{(2.91 \times 87.0/2.91^3)+(6.32 \times 10.8/6.32^3)+(24.22 \times 2.2/24.2^3)\}/(8\ 7.0/2.91^3+10.8/6.32^3+2.2/24.2^3)$.

[Distribution of Catalyst Metal Particles in Metal-Supported Catalyst; Electron Beam Tomography]

The distribution of the catalyst metal particles in the metal-supported catalyst was evaluated by electron beam tomography. That is, first, a particle image of the metal-supported catalyst was obtained with a scanning transmission electron microscope (STEM) (JEM-ARM200F, manufactured by JEOL Ltd.). A sample was dispersed in pure water, the dispersion was then placed on a Cu mesh with a carbon support membrane, and the resultant was fixed to a sample table. At the time of observation, the sample table was tilted from +78° to −78° (step angle: 2°), and thus one metal-supported catalyst particle was observed from a plurality of angles to obtain a plurality of STEM particle images. The observation was performed under the condition of an observation magnification of from 800,000 times to 1,000,000 times.

Figure 5:
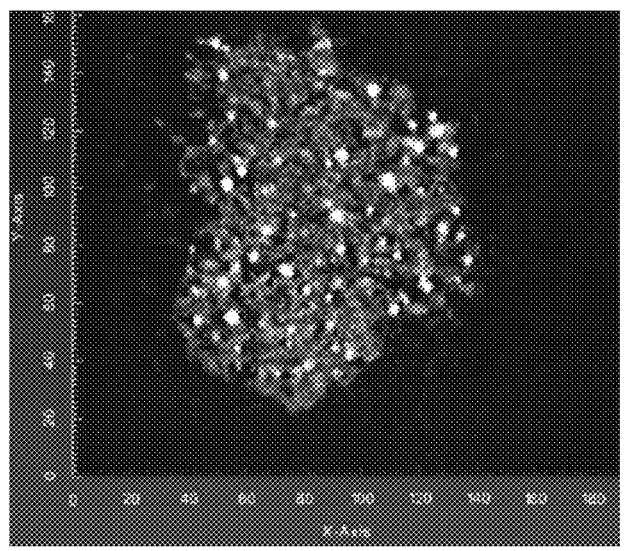
FIG. 5 is an explanatory image showing an example of a three-dimensional reconstructed particle image obtained by electron beam tomography of a metal-supported catalyst.

After that, the plurality of STEM particle images obtained by the observation from the plurality of angles were reconstructed through use of 3D reconstruction software, to thereby obtain a three-dimensional reconstructed particle image (hereinafter referred to as "3D particle image") of the metal-supported catalyst particles. That is, through use of 3D reconstruction software, the plurality of STEM particle images were subjected to position alignment of identical sites and rotation axis alignment and subjected to a Fourier transform, and then a plurality of Fourier images were formed and subjected to an inverse Fourier transform, to thereby obtain the 3D particle image. In FIG. 5, there is shown an example of a view of a 3D particle image obtained for the metal-supported catalyst of Example 3 from the Z-axis direction. In FIG. 5, the unit of numerical values shown on the X-axis and the Y-axis is nm.

In addition, through use of 3D data analysis software, from the 3D particle image of the metal-supported catalyst particles, differences in brightness were utilized to determine particularly bright portions as the catalyst metal particles, a bright portion as the carbon carrier, and dark portions as pores to obtain a 3D reconstructed image showing only the catalyst metal particles, a 3D reconstructed image showing only the carbon carrier, and a 3D reconstructed image showing only the pore portions of the carbon carrier. Then, through use of 3D data analysis software, in the 3D reconstructed image of the metal-supported catalyst particles, the X-axis and the Y-axis were fixed, and only the position in the Z-axis direction was changed in increments of about 0.5 nm to generate cross-sectional particle images at respective Z-axis positions (catalyst metal particle images in a plane parallel to the XY plane). About 200 to about 350 of such cross-sectional particle images were generated for one metal-supported catalyst particle.

Then, the 3D particle image and the respective cross-sectional particle images of the metal-supported catalyst particles were each subjected to image analysis through use of image analysis software to determine the positions of the catalyst metal particles. Further, the positions of the depths of the catalyst metal particles from the outer surface of the carbon carrier were determined. Then, the number of catalyst metal particles supported on the outer surface of the carbon carrier and the number of catalyst metal particles each supported at a position having a predetermined depth from the outer surface (inside the carbon carrier) were each counted.

Catalyst metal particles supported inside the carbon carrier were identified as particles not recognized on the surface of a 3D reconstructed image obtained by overlaying the 3D reconstructed image of the carbon carrier and the 3D reconstructed image of the pore portions of the carbon carrier on a 3D reconstructed image of the catalyst metal particles. Meanwhile, catalyst metal particles supported on the external surface of the carbon carrier were identified as particles other than the catalyst metal particles supported inside the carbon carrier. For the distribution of the catalyst metal particles in the metal-supported catalyst, metal particles each having a particle diameter recognizable through image analysis (e.g., a particle diameter of 1 nm or more) were used as analysis objects. The depth of a position at which a catalyst metal particle was supported inside the carbon carrier was defined as the shortest distance between the outer surface of the carbon carrier and the surface of the catalyst metal particle. Specifically, when the shortest distance between the surface of a catalyst metal particle and the outer surface of the carbon carrier was 20 nm or more, the catalyst metal particle was identified to be supported at a position having a depth of 20 nm or more from the surface of the carbon carrier.

The proportion of the number of catalyst metal particles each supported at a position having a depth of 20 nm or more from the outer surface of the carbon carrier of the metal-supported catalyst to the total number of catalyst metal particles supported on the carbon carrier ("catalyst metal supported proportion at a depth of 20 nm or more") was calculated by the following equation: "catalyst metal supported proportion at a depth of 20 nm or more" (%)="number of catalyst metal particles each supported at position having depth of 20 nm or more from outer surface of carbon carrier"÷"total number of catalyst metal particles supported on carbon carrier"×100.

The proportion of the number of catalyst metal particles supported on the outer surface of the carbon carrier of the metal-supported catalyst to the total number of catalyst metal particles supported on the carbon carrier (catalyst metal supported proportion at outer surface) was calculated by the following equation: catalyst metal supported proportion at outer surface (%)="number of catalyst metal particles supported on outer surface of carbon carrier"÷"total number of catalyst metal particles supported on carbon carrier"×100.

The proportion of the sum of the number of catalyst metal particles supported on the outer surface of the carbon carrier of the metal-supported catalyst and the number of catalyst metal particles each supported at a position having a depth of 5 nm or less from the outer surface to the total number of catalyst metal particles supported on the carbon carrier ("catalyst metal supported proportion at outer surface+a depth of 5 nm or less") was calculated by the following equation: "catalyst metal supported proportion at outer surface+a depth of 5 nm or less" (%)={"number of catalyst metal particles supported on outer surface of carbon carrier"+"number of catalyst metal particles each supported at position having depth of 5 nm or less from outer surface of carbon carrier"}÷"total number of catalyst metal particles supported on carbon carrier"×100.

[Tortuosity of Metal-supported Catalyst: Electron Beam Tomography]

Figure 6A:
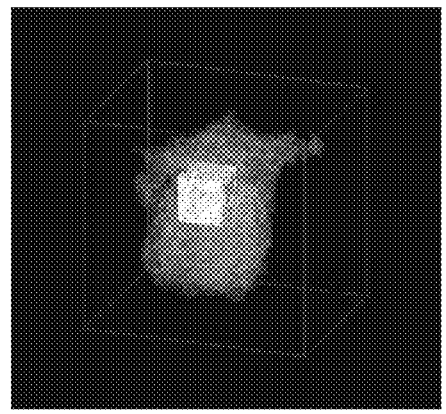
FIG. 6A is an explanatory image showing an example of a three-dimensional reconstructed image of a carbon carrier of a metal-supported catalyst obtained by electron beam tomography.

The tortuosity of the metal-supported catalyst was measured by electron beam tomography. That is, first, as described above, a 3D particle image of the metal-supported catalyst was obtained by electron beam tomography, and then a 3D reconstructed image showing only the carbon carrier portion was obtained from the 3D particle image through use of 3D data analysis software. In FIG. 6A, an example of the 3D reconstructed image of the carbon carrier portion obtained for the metal-supported catalyst of Example 3 is shown.

Figure 6B:
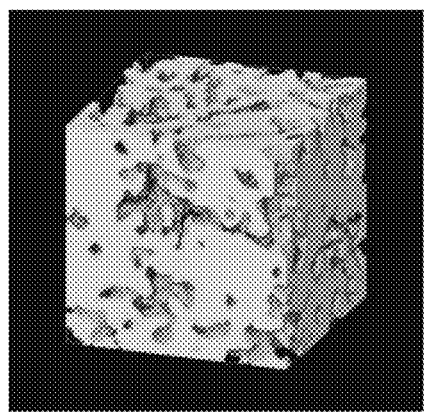
FIG. 6B is an explanatory image showing an example of a three-dimensional reconstructed image of a cube obtained from the three-dimensional reconstructed image shown in FIG. 6A.

Then, a cube having a size of from about 20 nm to about 40 nm on a side was cut out of the 3D reconstructed image of the carbon carrier portion as a 3D reconstructed image of part of the inside of the carbon carrier. In FIG. 6B, a 3D reconstructed image of part of the carbon carrier cut out of the 3D reconstructed image of the entire carbon carrier shown in FIG. 6A is shown. That is, the cube shown in FIG. 6B corresponds to the small and white cube portion brightly shown in FIG. 6A.

Figure 6C:
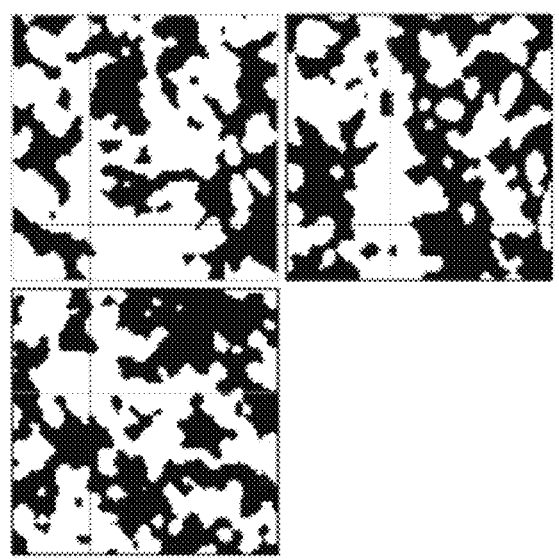
FIG. 6C includes explanatory images showing examples of three cross-sectional images obtained from the three-dimensional reconstructed image of the cube shown in FIG. 6B.

After that, the 3D reconstructed image of the cube was cut in each axis direction of the X-axis, Y-axis, and Z-axis of three-dimensional orthogonal coordinates to obtain cross-sectional images. Here, the cross-sectional images are binarized so that the skeleton of the carbon carrier is displayed black, and any other portion, that is, a void portion or a catalyst metal particle portion is displayed white. In FIG. 6C, there is shown an example of each of an X-axis cross-sectional image, a Y-axis cross-sectional image, and a Z-axis cross-sectional image each of which was cut out of the 3D reconstructed image of the cube shown in FIG. 6B and was binarized.

Figure 6D:
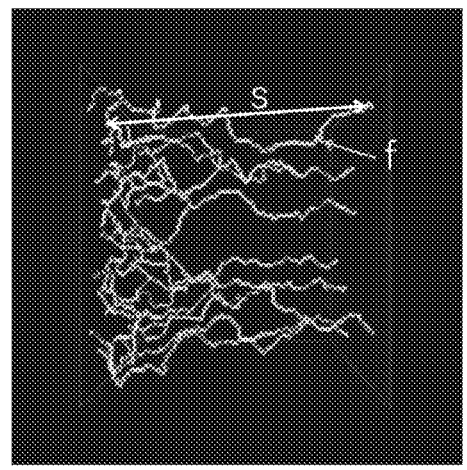
FIG. 6D is an explanatory image showing void paths determined in one of the cross-sectional images shown in FIG. 6C.
Figure 6E:
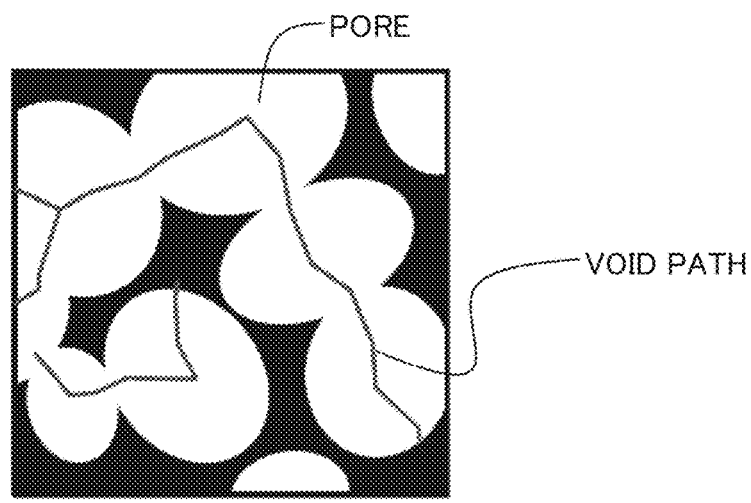
FIG. 6E is an explanatory view for schematically illustrating an example of the determination of void paths.
Figure 6F:
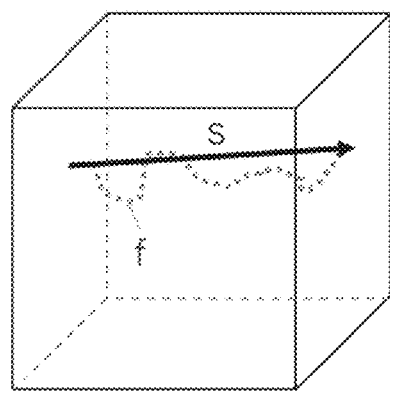
FIG. 6F is an explanatory view for schematically illustrating the length and shortest straight-line distance of a void path in the three-dimensional reconstructed image of the cube.

After that, lines connecting the central points of white portions in the cross-sectional images were determined as void paths. In FIG. 6D, a plurality of void paths determined in one of the cross-sectional images shown in FIG. 6C are shown as white lines. In addition, in FIG. 6E, an example of the determination of void paths is schematically illustrated. In FIG. 6E, the skeleton portion of the carbon carrier is shown in a black color, pore portions are shown in a white color, and void paths are shown as lines connecting the central points of the pores. Then, the tortuosity of the metal-supported catalyst was calculated by the following equation; tortuosity=f/s ("f" represents the length of a void path from one face of the cube to the other face opposed to the above-mentioned face, and "s" represents the length of a straight line connecting a point of the void path on the one face and a point thereof on the other face (shortest straight-line distance). In FIG. 6F, the length "f" of one void path (dotted line) in the 3D image of the cube, and the shortest straight-line distance "s" of the void path are schematically illustrated. The tortuosity of each metal-supported catalyst was obtained as an arithmetic average value by: identifying, in the cube of the 3D reconstructed image of the carbon carrier obtained from one 3D particle image, a plurality of void paths each connecting a point on one face and a point on the other face opposed thereto in each of the X-axis direction, the Y-axis direction, and the Z-axis direction; calculating the tortuosity of each of the plurality of void paths; and dividing the sum of the tortuosities of the void paths by the number of the void paths.

[Performance Evaluation of Battery Including Electrode Containing Metal-Supported Catalyst]

Performance evaluation of a fuel cell including a cathode containing the metal-supported catalyst was performed. Specifically, first, a battery cathode having a catalyst layer containing a metal-supported catalyst formed thereon was produced. That is, an electrolyte (EW700) in such an amount that the weight ratio thereof to a carbon carrier was 0.9 was added to 0.25 g of a metal-supported catalyst, and 2 g each of distilled water and 1-propanol were added to prepare an electrolyte solution. The electrolyte solution and 25 g of balls were loaded into a pot and mixed with a ball mill at 200 rpm for 50 minutes, to thereby obtain a slurry-like composition for a catalyst layer containing the uniformly dispersed metal-supported catalyst.

The obtained slurry-like composition for a catalyst layer was applied onto a region having an area of 5 cm of a gas diffusion layer ("29BC", manufactured by SGL Carbon Japan Co., Ltd.) (2.3 cm×2.3 cm) so that the content of the catalyst metal particles supported on the metal-supported catalyst per unit area of the battery electrode became 0.2 mg/cm$^2$, and dried to form a catalyst layer on the gas diffusion layer. Thus, a battery electrode having the catalyst layer containing the metal-supported catalyst formed thereon was obtained.

Next, a fuel cell including the battery electrode having the catalyst layer containing the metal-supported catalyst formed thereon was produced. That is, the battery electrode including the catalyst layer (positive electrode catalyst layer) produced as described above was used as a positive electrode, Meanwhile, a negative electrode was produced as described below. 0.5 g of Pt/C (catalyst containing platinum particles supported on a carbon carrier: UNPC40-II, manufactured by Ishifuku Metal Industry Co., Ltd.), 10 g of 5% NAFION (trademark), 2 g of distilled water, and 25 g of balls were loaded into a pot and mixed with a ball mill at 200 rpm for 50 minutes, to thereby prepare a slurry-like Pt/C composition. A negative electrode including a catalyst layer (negative electrode catalyst layer) formed of the slurry-like Pt/C composition was produced in the same manner as in the above-mentioned positive electrode except that the Pt/C composition was applied onto the gas diffusion layer (5 cm$^2$) so that the amount of Pt/C applied per unit area became 0.1 mg/cm$^2$.

Then, a polymer electrolyte membrane ("NAFION (trademark) 211", manufactured by DuPont) was arranged between the above-mentioned positive electrode catalyst layer and the above-mentioned negative electrode catalyst layer, and the resultant was subjected to pressure bonding under the conditions of 150° C. and 1 MPa for 3 minutes, to thereby produce a MEA. A pair of gaskets was bonded to the MEA, and further, the resultant MEA was sandwiched between a pair of separators, to thereby produce a fuel cell unit cell. After that, the unit cell produced as described above was installed in a fuel cell automatic evaluation system (manufactured by Toyo Corporation). First, a power generation test was performed, and then a durability test was performed.

In the power generation test, saturated humidified air (oxygen) was supplied at 2.5 L/min to a positive electrode side of the unit cell at a back pressure of 70 kPa (relative humidity: 100%), and saturated humidified hydrogen was supplied at 1.0 L/min to a negative electrode side of the unit cell, a cell temperature was set to 75° C. (relative humidity: 100%), and an open circuit voltage was measured for 5 minutes. After that, a cell current density was kept at each current density for 3 minutes from 4.0 A/cm$^2$ to 0 A/cm$^2$, and a cell voltage was measured.

Then, an output density obtained from a potential and a current density was calculated for each potential, and the highest value was measured as a maximum output density (mW/cm$^2$). In addition, a voltage (mV) at 1.0 A/cm$^2$ and a voltage (mV) at 3.0 A/cm$^2$ at the start of the durability test were recorded.

After that, the cell temperature was set to 75° C. Saturated humidified nitrogen was supplied at 0.5 L/min to both sides of the unit cell at a back pressure of 35 kPa (relative humidity: 100%), and saturated humidified hydrogen was supplied at 0.5 mL/min to an anode side of the unit cell (relative humidity: 100%). The durability test was performed by repeating a rectangular wave cycle of keeping a potential at 0.6 V for 30 seconds and at 1.0 V for 60 seconds.

After the above-mentioned rectangular wave cycle was repeated 2,100 times, the power generation test was performed again. A voltage (mV) at 1.0 A/cm$^2$ and a voltage (mV) at 3.0 A/cm$^2$ after the durability test were recorded. Then, a value obtained by subtracting the voltage (mV) at 1.0 A/cm$^2$ measured in the power generation test after the durability test (voltage (mV) after the 2, 100 cycles) from the voltage (mV) at 1.0 A/cm$^2$ measured as initial performance in the power generation test before the durability test was obtained as a voltage decrease amount (mV) at 1.0 A/cm$^2$ after the 2, 100 cycles. In addition, similarly, a value obtained by subtracting the voltage (mV) at 3.0 A/cm$^2$ measured in the power generation test after the durability test (voltage (mV) after the 2,100 cycles) from the voltage (mV) at 3.0 A/cm$^2$ measured as initial performance in the power generation test before the durability test was obtained as a voltage decrease amount (mV) at 3.0 A/cm$^2$ after the 2,100 cycles.

[Evaluation of Catalytic Activity of Carbon Carrier]

The catalytic activity of the carbon carrier alone was evaluated through use of a rotating ring-disk electrode apparatus (RRDE-3A Rotating Ring Disk Electrode Apparatus ver. 1.2, manufactured by BAS Inc.) and a dual electrochemical analyzer (CHI700C, manufactured by ALS Co., Ltd.).

That is, first, a rotating ring-disk electrode apparatus of a three-electrode system including a working electrode containing the carbon carrier (carbon carrier not having supported thereon the catalyst metal particles) was produced. Specifically, 5 mg of the carbon carrier, 50 μL of 5% NAFION (trademark) (manufactured by Sigma-Aldrich, NAFION perfluorinated ion-exchange resin, 5% solution (product number: 510211)), 400 μL of water, and 100 μL of isopropyl alcohol were mixed to prepare a slurry. Next, the slurry was subjected to ultrasonic treatment for 10 minutes, and then subjected to homogenizer treatment for 2 minutes. Then, the resultant slurry was applied to a working electrode (ring-disk electrode for RRDE-3A, platinum ring-gold disk electrode, disk diameter: 4 mm, manufactured by BAS Inc.) so that the content of the carbon carrier per unit area of the electrode became 0.1 mg/cm$^2$, and dried, to thereby produce a working electrode carrying the carbon carrier, In addition, a platinum electrode (Pt counter electrode of 23 cm, manufactured by BAS Inc.) was used as a counter electrode, and a reversible hydrogen electrode (RHE) (storage type reversible hydrogen electrode, manufactured by EC Frontier Co., Ltd.) was used as a reference electrode. Thus, a rotating ring-disk electrode apparatus including the working electrode containing the carbon carrier, the platinum electrode serving as the counter electrode, and the reversible hydrogen electrode (RHE) serving as the reference electrode was obtained. In addition, a 0.1 M aqueous solution of perchloric acid was used as an electrolytic solution.

Then, catalytic activity was measured using the above-mentioned rotating ring-disk electrode apparatus. That is, the linear sweep voltammetry under a nitrogen atmosphere ($N_2$-LSV) and the linear sweep voltammetry under an oxygen atmosphere ($O_2$-LSV) were performed using the rotating ring-disk electrode apparatus of a three-electrode system including the working electrode containing the carbon carrier.

In the $N_2$-LSV, first, nitrogen bubbling was performed for 10 minutes to remove oxygen in the electrolytic solution. After that, the electrodes were rotated at a rotation speed of 1,600 rpm, and a current density at a time when potential sweep was performed at a sweep rate of 20 mV/sec was recorded as a function of potential ($N_2$-LSV).

In the $O_2$-LSV, further, oxygen bubbling was then performed for 10 minutes to fill the electrolytic solution with saturated oxygen. After that, the electrodes were rotated at a rotation speed of 1,600 rpm, and a current density at a time when potential sweep was performed at a sweep rate of 20 mV/sec was recorded as a function of potential ($O_2$-LSV).

Then, the $N_2$-LSV was subtracted from the $O_2$-LSV to obtain an oxygen reduction voltammogram. In the obtained oxygen reduction voltammogram, numerical values were signed so that a reduction current took a negative value and an oxidation current took a positive value.

From the thus obtained oxygen reduction voltammogram, a voltage at a time when a reduction current of $-10$ $\mu A/cm^2$ flowed (oxygen reduction-starting potential $E_{O2}$) (V vs. NHE), and a current density $I_{0.7}$ ($mA/cm^2$) at a time when a voltage of 0.7 V (vs. NHE) was applied were recorded as indicators of the catalytic activity of the carbon carrier itself.

[Results]

In FIG. 7, for each of Examples 1 to 6 and Examples C1 to C7, the method of producing the metal-supported catalyst, the results of the evaluation of the characteristics of the metal-supported catalyst, the results of the evaluation of the performance of the battery including the metal-supported catalyst, and the results of the evaluation of the catalytic activity of the carbon carrier itself are shown, In FIG. 7, the "burial of catalyst metal particles in pore inner surface" row shows the results of the evaluation of whether or not the metal-supported catalyst included catalyst metal particles that were partially buried in the pore inner surface of the carbon carrier.

In this evaluation, when the metal-supported catalyst satisfied all of the three conditions, i.e., the condition of having a catalyst metal particle diameter/pore diameter ratio of 0.70 or more and 1.30 or less, the condition of having a maximum value of the $N_2$ desorption/adsorption amount ratio of 1.05 or less, and the condition of having a catalyst metal supported proportion at outer surface of 33% or less, the metal-supported catalyst was judged to include catalyst metal particles that were partially buried in the pore inner surface of the carbon carrier, and was marked with Symbol "○" in the "burial of catalyst metal particles in pore inner surface" row, and when the metal-supported catalyst did not satisfy one or more of the three conditions, the metal-supported catalyst was judged not to include the catalyst metal particles that were partially buried in the pore inner surface of the carbon carrier, and was marked with Symbol "x" in the row.

As shown in FIG. 7, the performance of each of the batteries including the metal-supported catalysts of Examples 1 to 6 was remarkably superior to that of each of Examples C1 to C7. That is, the batteries including the metal-supported catalysts of Examples 1 to 6 each exhibited a maximum output density of 1,096 $mW/cm^2$ or more in the power generation test, a voltage decrease amount of 36 mV or less at a current density of 1.0 $A/cm^2$ in the durability test, and a voltage decrease amount of 53 mV or less at a current density of 3.0 $A/cm^2$.

In this regard, the metal-supported catalysts of Examples 1 to 6 satisfied all of the condition of having a catalyst metal particle diameter/pore diameter ratio of 0.70 or more and 1.30 or less, the condition of having a maximum value of the $N_2$ desorption/adsorption amount ratio of 1.05 or less, and the condition of having a catalyst metal supported proportion at outer surface of 33% or less, whereas the metal-supported catalysts of Examples C1 to C7 did not satisfy one or more of those three conditions.

That is, the metal-supported catalysts of Examples C1 to C4 and C6 did not satisfy the above-mentioned condition for the catalyst metal particle diameter/pore diameter ratio, the metal-supported catalysts of Examples C1 to C3 and C7 did not satisfy the above-mentioned condition for the $N_2$ desorption/adsorption amount ratio, and the metal-supported catalysts of Example C1, Example C2, and Example C5 to Example C7 did not satisfy the above-mentioned condition for the catalyst metal supported proportion at outer surface.

In addition, the metal-supported catalysts of Examples 1 to 6 further satisfied the condition of having a "catalyst metal supported proportion at a depth of 20 nm or more" of 11% or more, whereas the metal-supported catalysts of Examples C1 to C3 and C5 to C7 did not satisfy the condition.

In addition, the maximum values of the $N_2$ desorption/adsorption amount ratios of the carbon carrier C used in Example C1 and the carbon carrier D used in Example C7 were 1.23 and 1.06, respectively, and the carbon carriers C and D were inferior in interconnectivity of pores to the carbon carriers A and B.

In addition, although the metal-supported catalysts of Examples C5 and C6 each included the carbon carrier A as with Examples 1 to 3 and 5, the performance of each of the batteries including the metal-supported catalysts of Examples C5 and C6 was inferior to that of each of the batteries including the metal-supported catalysts of Examples 1 to 3 and 5. One of the causes of this is conceived to be that, in the production of the metal-supported catalysts of Examples C5 and C6, the methods F and G of supporting catalyst metal particles were adopted to perform liquid-phase reduction treatment.

The performance of each of the batteries including the metal-supported catalysts of Examples 1, 2, 3, 5, and 6 was superior to that of Example 4, In this regard, the number-average particle diameter of the catalyst metal particles supported on the metal-supported catalyst of Example 4 was 3.57 nm, whereas those of Examples 1, 2, 3, 5, and 6 were smaller. In addition, the metal-supported catalyst of Example 4 had a catalyst metal particle diameter/pore diameter ratio of 1.13, whereas those of Examples 1, 2, 3, 5, and 6 were smaller.

In the production of the metal-supported catalyst of Example 4, the method D of supporting catalyst metal particles was adopted to perform gas-phase reduction treatment for a relatively long period of time, and not to perform heating treatment in an inert atmosphere thereafter, and hence it is conceived that the aggregation of the catalyst metal particles proceeded during the gas-phase reduction treatment.

Further, the maximum output density of each of the batteries including the metal-supported catalysts of Examples 1, 2, 3, and 6 was superior to that of Example 5. In this regard, the volume-average particle diameter of the catalyst metal particles supported on the metal-supported catalyst of Example 5 was 5.55 nm, whereas those of Examples 1, 2, 3, 4, and 6 were smaller. In addition, the volume-average particle diameter of the catalyst metal particles supported on the metal-supported catalyst of Example 4 was 4.74 nm, whereas those of Examples 1, 2, 3, and 6 were smaller. In addition, the metal-supported catalysts of Examples 4 and 5 each had a catalyst metal supported proportion at outer surface of 32%, whereas those of Examples 1, 2, 3, and 6 were smaller.

In the production of the metal-supported catalysts of Examples 4 and 5, the methods D and E of supporting catalyst metal particles were adopted to perform gas-phase reduction treatment for a relatively long period of time, and not to perform heating treatment in an inert atmosphere thereafter, and hence it is conceived that the aggregation of the catalyst metal particles proceeded during the gas-phase reduction treatment.

In addition, although the metal-supported catalysts of Examples 4 and 6 both included the carbon carrier B, the performance of the battery including the metal-supported catalyst of Example 6 was superior to that of Example 4. In this regard, the number-average particle diameter and volume-average particle diameter of the catalyst metal particles of the metal-supported catalyst of Example 6 were smaller than those of Example 4.

In the production of the metal-supported catalyst of Example 6, the method A of supporting catalyst metal particles was adopted to perform heating treatment in an inert atmosphere subsequently to gas-phase reduction treatment, and it is conceived that, as a result, the number-average particle diameter and volume-average particle diameter of the catalyst metal particles were both reduced to be smaller than those of Example 4.

In addition, the performance of each of the batteries including the metal-supported catalysts of Examples 1, 2, and 3 was extremely remarkably excellent. That is, the batteries including the metal-supported catalysts of Examples 1, 2, and 3 each exhibited a maximum output density of 1,315 mW/cm$^2$ or more in the power generation test, a voltage decrease amount of 25 mV or less at a current density of 1.0 A/cm$^2$ in the durability test, and a voltage decrease amount of 19 mV or less at a current density of 3.0 A/cm$^2$.

In this regard, in each of the metal-supported catalysts of Examples 1, 2, and 3, the number-average particle diameter of the catalyst metal particles was smaller than those of Examples 4, 5, and 6. In each of the metal-supported catalysts of Examples 1, 2, and 3, the volume-average particle diameter of the catalyst metal particles was smaller than those of Examples 4 and 5. The metal-supported catalysts of Examples 1, 2, and 3 each had a smaller catalyst metal supported proportion at outer surface than those of Examples 4 and 5. The metal-supported catalysts of Examples 1, 2, and 3 each had a smaller catalyst metal particle diameter/pore diameter ratio than those of Examples 4 and 6. The metal-supported catalysts of Examples 1, 2, and 3 each had a smaller median diameter of the carbon carrier than those of Examples 4 and 6. The metal-supported catalysts of Examples 1, 2, and 3 each had a smaller Raman D half width at half maximum than those of Examples 4 and 6.

In addition, the results of the evaluation of the catalytic activity exhibited by the carbon carrier alone not supporting the catalyst metal particles were as described below. The carbon carrier A exhibited an oxygen reduction-starting potential $E_{O2}$ of 0.76 (V vs. NHE) and a current density $I_{0.7}$ of −0.1 (mA/cm$^2$), the carbon carrier B exhibited an oxygen reduction-starting potential $E_{O2}$ of 0.83 (V vs. NHE) and a current density $I_{0.7}$ of −1.8 (mA/cm$^2$), and the carbon carrier D exhibited an oxygen reduction-starting potential $E_{O2}$ of 0.75 (V vs. NHE) and a current density $I_{0.7}$ of −0.1 (mA/cm$^2$). Meanwhile, the carbon carrier C exhibited an oxygen reduction-starting potential $E_{O2}$ of 0.26 (V vs. NHE), but exhibited a current density $I_{0.7}$ of zero (mA/cm$^2$).

That is, the carbon carrier A, the carbon carrier B, and the carbon carrier D each exhibited remarkable oxygen reduction activity alone, whereas the carbon carrier C did not exhibit oxygen reduction activity. In the above-mentioned measurement method, a slight oxygen reduction reaction occurs even when no catalyst is present. Accordingly, it is concluded that, in the above-mentioned measurement method, the carbon carrier exhibited oxygen reduction activity only when an oxygen reduction-starting potential $E_{O2}$ of 0.35 (V vs. NHE) or more was obtained.

What is claimed is:

1. A metal-supported catalyst, comprising:
   a carbon carrier; and
   catalyst metal particles supported on the carbon carrier,
   wherein a ratio of a number-average particle diameter of the catalyst metal particles to an average pore diameter of the metal-supported catalyst is 0.70 or more and 1.30 or less,
   wherein, at a relative pressure of a nitrogen adsorption isotherm of the metal-supported catalyst within a range of 0.4 or more and 0.6 or less, a maximum value of a ratio of a nitrogen adsorption amount of a desorption-side isotherm to a nitrogen adsorption amount of an adsorption-side isotherm is 1.05 or less, and
   wherein a proportion of a number of the catalyst metal particles supported at a position having a depth of 20 nm or more from an outer surface of the carbon carrier to a total number of the catalyst metal particles supported on the carbon carrier is 11% or more.

2. The metal-supported catalyst according to claim 1, wherein the metal-supported catalyst comprises the catalyst metal particles that are partially buried in a pore inner surface of the carbon carrier.

3. The metal-supported catalyst according to claim 1, wherein a proportion of a number of the catalyst metal particles supported on the outer surface of the carbon carrier to the total number of the catalyst metal particles supported on the carbon carrier is 33% or less.

4. The metal-supported catalyst according to claim 1, wherein the number-average particle diameter of the catalyst metal particles is 1.50 nm or more and 5.00 nm or less.

5. The metal-supported catalyst according to claim 1, wherein a volume-average particle diameter of the catalyst metal particles is 2.00 nm or more and 6.50 nm or less.

6. The metal-supported catalyst according to claim 1, wherein the metal-supported catalyst has a BET specific surface area by a nitrogen adsorption method of 200 (m$^2$/g-carbon carrier) or more.

7. The metal-supported catalyst according to claim 1, wherein the metal-supported catalyst has a ratio of a BET specific surface area (m$^2$/g-carbon carrier) by a water vapor adsorption method to a BET specific surface area (m$^2$/g-carbon carrier) by a nitrogen adsorption method of 0.080 or less.

8. The metal-supported catalyst according to claim 1, wherein the metal-supported catalyst has a volume of pores each having a pore diameter of less than 5 nm of 0.50 (cm$^3$/g-carbon carrier) or more.

9. The metal-supported catalyst according to claim 1, wherein the metal-supported catalyst has a ratio of a volume of pores each having a pore diameter of less than 5 nm to a volume of pores each having a pore diameter of 5 nm or more of 1.80 or more.

10. The metal-supported catalyst according to claim 1, wherein the metal-supported catalyst has a tortuosity of 1.90 or less.

11. The metal-supported catalyst according to claim 1, wherein the metal-supported catalyst comprises a carbon structure that exhibits a half width at half maximum of 85.0 cm$^{-1}$ or less of a D band having a peak top in a vicinity of 1,340 cm$^{-1}$ in a Raman spectrum obtained by Raman spectroscopy.

12. The metal-supported catalyst according to claim 1, wherein the carbon carrier has a median diameter of 1.00 µm or less.

13. The metal-supported catalyst according to claim 1, wherein the catalyst metal particles are platinum particles.

14. A battery electrode, comprising the metal-supported catalyst of claim 1.

15. A battery, comprising the battery electrode of claim 14.

* * * * *